US010805086B2

(12) United States Patent
Karmoose et al.

(10) Patent No.: US 10,805,086 B2
(45) Date of Patent: Oct. 13, 2020

(54) METHODS AND ARRANGEMENTS FOR VEHICLE-TO-VEHICLE COMMUNICATIONS

(71) Applicant: INTEL CORPORATION, Santa Clara, CA (US)

(72) Inventors: Mohammed Karmoose, Los Angeles, CA (US); Rafael Misoczki, Hillsboro, OR (US); Liuyang Yang, Portland, OR (US); Xiruo Liu, Portland, OR (US); Moreno Ambrosin, Hillsboro, OR (US); Manoj R. Sastry, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 354 days.

(21) Appl. No.: 15/848,785

(22) Filed: Dec. 20, 2017

(65) Prior Publication Data

US 2019/0044728 A1    Feb. 7, 2019

(51) Int. Cl.
*H04L 29/06* (2006.01)
*H04L 9/32* (2006.01)
(Continued)

(52) U.S. Cl.
CPC ............. *H04L 9/3242* (2013.01); *G08G 1/22* (2013.01); *H04L 9/0637* (2013.01);
(Continued)

(58) Field of Classification Search
None
See application file for complete search history.

(56) References Cited

U.S. PATENT DOCUMENTS 9,852,637 B2 *  12/2017  Hayee ..................... G08G 1/22
10,353,387 B2 *  7/2019  Stenneth .......... G06Q 10/06315
(Continued)

OTHER PUBLICATIONS

"Wireless Access in Vehicular Environments—Security Services for Applications and Management Messages", IEEE 1609.2 Standard, IEEE Vehicular Technology Society, Jan. 2016.
(Continued)

*Primary Examiner* — Shin-Hon (Eric) Chen

(57) ABSTRACT

Logic may implement protocols and procedures for vehicle-to-vehicle communications for platooning. Logic may implement a communications topology to distinguish time-critical communications from non-time-critical communications. Logic may sign time-critical communications with a message authentication code (MAC) algorithm with a hash function such as Keccak MAC or a Cipher-based MAC. Logic may generate a MAC based on pairwise, symmetric keys to sign the time-critical communications. Logic may sign non-time-critical communications with a digital signature. Logic may encrypt non-time-critical communications. Logic may append a certificate to non-time-critical communications. Logic may append a header to messages to create data packets and may include a packet type to identify time-critical communications. Logic may decode and verify the time-critical messages with a pairwise symmetric key. And logic may prioritize time-critical communications to meet a specified latency.

21 Claims, 8 Drawing Sheets

(51) Int. Cl.
*G08G 1/00* (2006.01)
*H04L 9/14* (2006.01)
*H04L 9/30* (2006.01)
*H04L 9/06* (2006.01)
*H04L 9/12* (2006.01)
*H04L 29/12* (2006.01)

(52) U.S. Cl.
CPC .............. *H04L 9/0643* (2013.01); *H04L 9/12* (2013.01); *H04L 9/14* (2013.01); *H04L 9/30* (2013.01); *H04L 9/3297* (2013.01); *H04L 61/6022* (2013.01); *H04L 2209/80* (2013.01); *H04L 2209/84* (2013.01)

(56) References Cited

U.S. PATENT DOCUMENTS

| | | | |
|---|---|---|---|
| 2010/0256852 A1* | 10/2010 | Mudalige | G08G 1/163 701/24 |
| 2012/0311340 A1* | 12/2012 | Naganuma | G06F 21/35 713/176 |
| 2017/0132477 A1* | 5/2017 | Kim | G06K 9/325 |
| 2017/0344023 A1* | 11/2017 | Laubinger | B60W 50/14 |
| 2018/0205729 A1* | 7/2018 | Carlesimo | H04L 63/0876 |
| 2019/0007215 A1* | 1/2019 | Hakuta | H04L 63/123 |
| 2019/0306678 A1* | 10/2019 | Byun | H04W 76/23 |
| 2020/0005650 A1* | 1/2020 | Park | G05D 1/0088 |

OTHER PUBLICATIONS

Ploeg et al., "Design and experimental evaluation of cooperative adaptive cruise control", 14th International IEEE Conference on Intelligent Transportation Systems (ITSC), 2011, 7 pages.

Wang et al., "Coordinated vehicle platoon control: Weighted and constrained consensus and communication network topologies" IEEE 51st Annual Conference on Decision and Control (CDC), 2012, 6 pages.

Tsudik, Gene, "Message authentication with one-way hash functions", ACM Computer Communications Review, 1992, 10 pages.

* cited by examiner

FIG. 1F - TIME CRITICAL MESSAGES
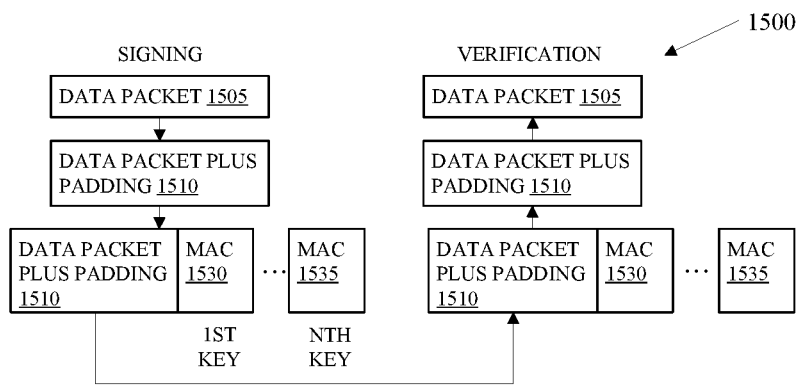
FIG. 1G - NON-TIME CRITICAL MESSAGES
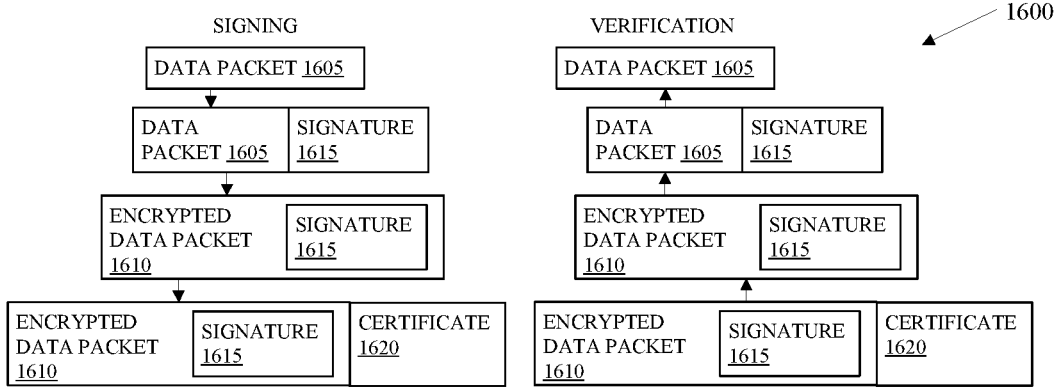

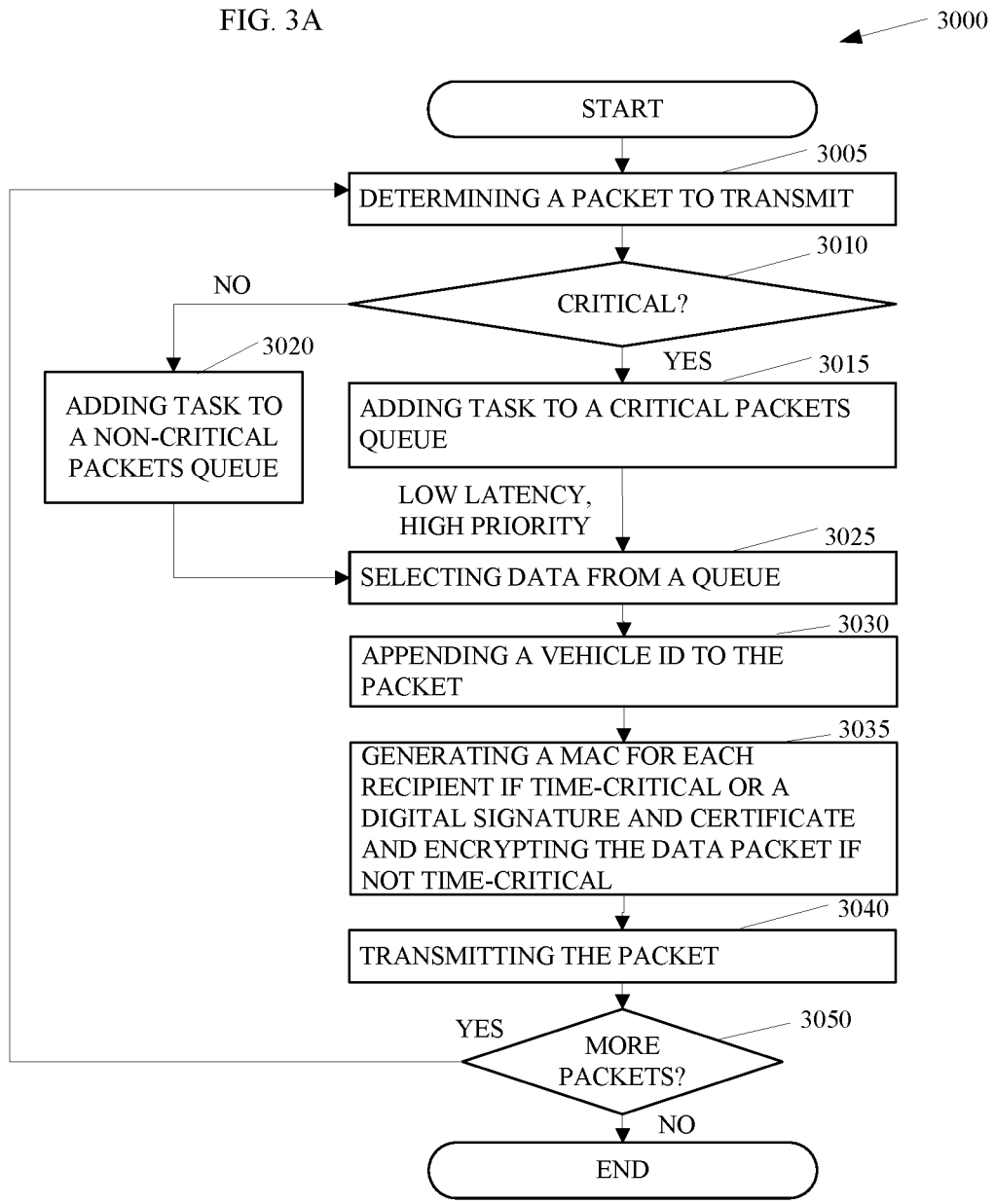

METHODS AND ARRANGEMENTS FOR VEHICLE-TO-VEHICLE COMMUNICATIONS

TECHNICAL FIELD

Embodiments are in the field of secure wireless communications. More particularly, embodiments may implement communication protocols and procedures for vehicle-to-vehicle communications.

BACKGROUND

The Institute of Electrical and Electronics Engineers (IEEE) 1609.2™ standard "Wireless Access in Vehicular Environments—Security Services for Applications and Management Messages", IEEE Vehicular Technology Society, 29 Jan. 2016, defines secure message formats and processing for use by Wireless Access in Vehicular Environments (WAVE) devices, including methods to secure WAVE management messages and methods to secure application messages. IEEE 1609.2™ proposes a security architecture for vehicular networks, to protect vehicular communications from cyber-attacks. More specifically, it proposes the use of digital signatures to protect the authenticity and integrity of the vehicle-to-everything (V2X) messages, and certificates to guarantee peer authentication.

One application for vehicle-to-vehicle (V2V) communications relates to platooning. Platooning refers to vehicles such as cars or trucks that form a group, typically in a line, on the road to reduce fuel consumption, improve traffic management, reduce road congestion, improve commute experience, and/or to increase safety. Platooning requires participating vehicles to coordinate through V2V communications to form a platoon of closely-spaced vehicles driving at almost identical speeds.

BRIEF DESCRIPTION OF THE DRAWINGS

FIGS. 1F-G depict embodiments of data packet security for transmission of time critical and non-time-critical messages such as the data packets discussed in conjunction with FIG. 1A;

FIGS. 3A-B depict embodiments of flowcharts to encode and decode vehicle-to-vehicle communications for platooning.

DETAILED DESCRIPTION OF EMBODIMENTS

Figure 1A:
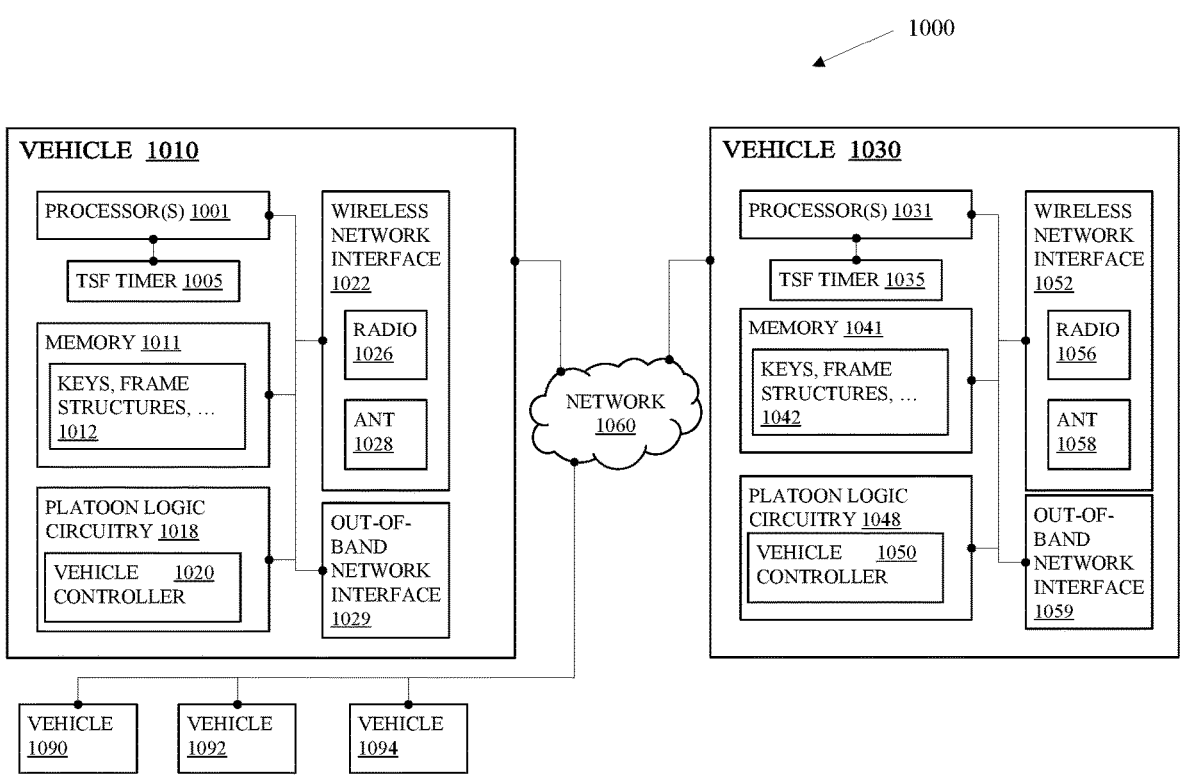
FIG. 1A depicts an embodiment of a wireless network to support vehicle-to-vehicle communications for platooning.

The following is a detailed description of embodiments depicted in the drawings. The detailed description covers all modifications, equivalents, and alternatives falling within the appended claims.

Embodiments may comprise platoon logic circuitry to perform the platoon-related functionality discussed herein. The platoon logic circuitry comprises hardware and possibly code such as platooning logic for a vehicle, a processor to execute code of the platooning logic, a microcontroller to execute microcode of the platooning logic, application-specific integrated circuits, state machines, a wireless network interface, and/or the like. The platooning logic may comprise any one or more forms of code such as software, firmware, microcode, or the like to perform a portion of or all the platoon-related functionality discussed herein in conjunction with the platoon logic circuitry.

Some embodiments comprise a vehicle such as a car or truck. The platooning logic circuitry may implement vehicle-to-vehicle (V2V) communications in accordance with a platooning application architecture. In some embodiments, the architecture comprises a hybrid system for security for platooning communications. In one embodiment, the platooning logic circuitry includes a first system for security for time-critical messages and a second system for security for non-time-critical messages. The messages are data packets that include a header to identify the data packet and a payload that includes data related to a task such as sensor data or platoon data.

The platoon application architecture may include a platoon initiation layer, an operation layer, and a management layer. In many embodiments, the platoon application architecture includes a platoon initiation layer, an operation layer, a basic maneuvers layer, and a management layer. In further embodiments, the platoon application architecture includes a platoon initiation layer, an operation layer, a basic maneuvers layer, an advanced maneuvers layer, and a management layer.

In many embodiments, the operation layer can use BSMs data packets standardized by SAE 2735 to communicate basic safety information related to platooning. In other embodiments, the operation layer, includes basic information required to maintain the relative longitudinal and lateral positions of vehicles participating in the platoon. The operation layer tasks may involve transmission of high priority information in data packets such as position, speed, velocity, acceleration, heading, road curvature. Other embodiments may include different data from vehicular sensors in order for a vehicle participating in a platoon to maintain its longitudinal and lateral control as deemed necessary by a vehicle controller 1020.

Several embodiments impose an end-to-end latency (E2EL) requirement of 100 milliseconds for communication of operation layer tasks from generating a data packet related to an operation layer task that is time-critical through decoding that data packet by a participating vehicle of the platoon. Other embodiments impose different E2EL's for the operation layer tasks. Some embodiments impose E2EL's for one or more of the basic maneuvers tasks, advanced maneuvers tasks, and/or management layer tasks. In many embodiments, the platoon logic circuitry performs operation layer tasks continuously or periodically such as 10 times per second or an information refresh rate of 10 Hertz (Hz) in a platoon to ensure a fine granularity of control over the positioning of each of the vehicles in the platoon and to maintain a stability of the platoon.

Some embodiments define non-time-critical information as all communications related to platooning. Some embodiments may distinguish data packets related to operation layer tasks by assigning packet types to the data packet transmissions related to the operation layer tasks. The value included for a packet type may distinguish a data packet related to an operation layer task from a data packet related to a different layer task. For instance, the platoon logic circuitry may transmit a data packet related to an operation layer task that includes a packet type field having a value that identifies the data packet as a time-critical packet type, a BSM packet type, an operations layer task, or a task that a recipient platoon logic circuitry can identify as an operation layer task. In some embodiments, multiple packet types are associated with the operation layer tasks and each packet type identifies the data packet as a time-critical packet. In other embodiments, one packet type is associated with the operations layer tasks. In further embodiments, the data packet includes a bit in the packet type field in a header of the data packet or another location in the header or frame body of the data packet that indicates that the data packet is time-critical.

The basic maneuvers layer may include tasks to change basic operations of the platoon such as change gap, change speed, lateral move, and/or longitudinal move. Some of these tasks include longitudinal and lateral motions performed by operations layer tasks and are time-critical even though the basic maneuver tasks are generally not time critical. Data packets related to basic maneuvers layer tasks may include a packet type to identify the data packets as non-time-critical, as not an operation layer task, as a time-critical operations layer task, or as a time-critical, operation layer task that is part of a basic maneuvers layer task. In one embodiment, the packet type identifies the data packets related to basic maneuvers layer tasks as a basic maneuvers layer task. In some embodiments, upper layer tasks, generally, can invoke operation layer tasks that are time-critical and, thus, a data packet related to the time-critical task includes an indication such as a value in the packet type field that identifies the data packet as time-critical despite being invoked by an upper layer.

The advanced maneuvers layer may include tasks to merge platoons and/or split platoons. While some of these tasks include longitudinal and lateral motions performed by advanced maneuvers layer tasks that are time-critical, some data packets related to the advanced maneuvers layer tasks can be non-time-critical because the overall maneuver is not time critical. Thus, data packets associated with advanced maneuvers may also include packet types that identify the data packets as not time-critical.

The management layer may include tasks for platoon admission, platoon removal, leader change, and/or member management that are not time critical. Data packets associated with management layer tasks may include packet types that identify the data packets as non-time-critical but may also include data packets that are time-critical such as data packets that implement operation layer tasks.

During platoon initiation, the platooning logic circuitry may identify one vehicle as a leader and the remaining vehicles by position within the platoon. In several embodiments, the leader communicates with all the other vehicles participating in the platoon and exchanges pairwise, symmetric keys with each of the vehicles participating in the platoon. In other words, the leader may exchange a different, symmetric key with each of the follower vehicles. For security, the platooning logic circuitry may perform the key exchanges through an out-of-band communication network, or via another secure communication procedure. Such key exchanges may occur during platoon initiation or in response to changes to the participating vehicles in the platoon via communications related to management layer tasks.

The vehicles in the platoon that are not the leader are follower vehicles and may communicate with at least one other vehicle in the platoon. For security, the platooning logic circuitry of each follower vehicle may exchange a pairwise, symmetric key with the at least one other vehicle during platoon initiation or via communications related to management layer tasks if a vehicle is added to, removed from, or changes positions within the platoon. In several embodiments, each vehicle in the platoon communicates with the leader vehicle and the vehicle behind except the last vehicle in the platoon.

During operation of the platoon, the vehicles continuously or periodically adjust speed and acceleration to maintain a target inter-vehicle distance and a target platoon speed. The platooning logic circuitry receives sensor data related to the longitudinal and lateral motion, and periodically generates and transmits the communications related to operation layer tasks to maintain the platoon speed and formation. In several embodiments, the leader vehicle generates a communication related to an operation layer task to transmit to all the follower vehicles. In such embodiments, the leader vehicle may determine the data packet to transmit and, for each follower vehicle, perform one or more hashing operations to generate a message authentication code (MAC) with a cryptographic hash function and a secret cryptographic key associated with the follower vehicle. For instance, if 20 vehicles participating in the platoon, the platooning logic circuitry of the leader vehicle may have 19 pairwise symmetric keys, one for each follower vehicle, may generate a data packet to share with each of the follower vehicles, and may sign the data packet with 19 different message authentication codes (MACs), one MAC for each of the 19 follower vehicles. The platooning logic circuitry for the leader may generate a MAC for each follower vehicle with a pairwise, symmetric key associated with that follower vehicle and include that MAC with the transmission of the data packet.

The follower vehicles may have one pairwise, symmetric key for the leader vehicle and a pairwise, symmetric key for the at least one other vehicle participating in the platoon. Upon receipt of the data packet from the leader vehicle, each follower vehicle may verify the MAC associated with that follower vehicle's pairwise, symmetric key for the leader vehicle and process the data in the payload of the data packet if the MAC authenticates the data packet. In several embodiments, the platooning logic circuitry of the leader does not encrypt the data packet of the operation layer tasks. In other embodiments, the platooning logic circuitry encrypts the data packet of the operation layer tasks.

The platooning logic circuitry of the follower vehicles may generate a data packet, sign the data packet with a MAC based on a pairwise, symmetric key for at least one other vehicle, and transmit the data packet with the MAC to the at least one other vehicle participating in the platoon. For instance, each follower vehicle may transmit a data packet with a MAC to the vehicle immediately behind using a pairwise, symmetric key shared with that vehicle. In some embodiments, the platoon logic circuitry hashes a concatenation of data packet and a symmetric key with a Keccak MAC (KMAC) such as, Keccak-224, Keccak-256, Keccak-384, Keccak-512, SHA3-224, SHA3-256, SHA3-384, and/or SHA3-512.

Embodiments may include wireless communications in a frequency band of about 5.9 GHz and may range between 5.855 GHz and 5.905 GHz, between 5.855 GHz and 5.925 GHz, between 5.770 GHz and 5.850 GHz, between 715 MHz and 725 MHz, or a combination thereof where GHz stands for gigahertz and MHz stands for megahertz. Other embodiments focus on other bandwidths in the same or other frequency bands. However, the embodiments are not limited to the bandwidths and frequency bands described herein.

Some embodiments are particularly directed to improvements for V2V and V2X wireless communications, such as one or more Institute of Electrical and Electronics Engineers (IEEE) standards. Such standards may include, for instance, the Institute of Electrical and Electronics Engineers (IEEE) 1609.2™ standard "Wireless Access in Vehicular Environments—Security Services for Applications and Management Messages", IEEE Vehicular Technology Society, 29 Jan. 2016. The embodiments are not limited to these.

Many embodiments facilitate wireless communications in accordance with multiple standards. Some embodiments may comprise low power wireless communications like Bluetooth, cellular communications, Wi-Fi, Road-Side Unit (RSU), Back-End Network (BEN), and other messaging systems. Furthermore, some wireless embodiments may incorporate a single antenna while other embodiments may employ multiple antennas or antenna elements.

While some of the specific embodiments described below will reference the embodiments with specific configurations, those of skill in the art will realize that embodiments of the present disclosure may advantageously be implemented with other configurations with similar issues or problems.

Various embodiments may be designed to address different technical problems associated with platooning. Other technical problems may include implementation of security measures for time-critical messages; ensuring an end-to-end latency E2EL of, e.g., 100 milliseconds for time-critical messages; tightly-coupled collective behavior of vehicles in a platoon such that behavior of one vehicle triggers an almost instantaneous response in all other vehicles of the platoon; handling of various road and traffic conditions by the platoon; performing multiple driving maneuvers by the platoon; managing platoon so that the collective benefits of the platoon outweigh the costs of establishing and maintaining a platoon; implementing security measures for vehicle-to-vehicle (V2V) communications within a platoon to protect the platoon from adversarial attacks; maintaining a stable platoon during performance of time-critical and non-time-critical tasks; implementing a security architecture that meets security objectives, performs multiple time-critical tasks within an E2EL, and maintains a stable platoon; and/or the like.

Different technical problems such as those discussed above may be addressed by one or more different embodiments. For instance, some embodiments that address problems associated with platooning may do so by one or more different technical means, such as, implementing a communications topology that distinguishes time-critical and non-time-critical data packets; implementing a communications topology that facilitates E2EL for multiple data packets during the E2EL of, e.g., 100 milliseconds for stability of the platoon; signing time-critical communications with a message authentication code (MAC) algorithm; generating a MAC based on pairwise, symmetric keys to sign the time-critical communications; signing non-time-critical communications with a digital signature; encrypting non-time-critical communications; appending a certificate to non-time-critical communications; appending a header including a packet type to identify time-critical communications; decoding the time-critical data packets with a pairwise symmetric key; prioritizing time-critical communications to meet a specified latency; and the like.

Several embodiments comprise systems with multiple processor cores such as central servers, access points, and/or stations (STAs) such as modems, routers, switches, servers, workstations, netbooks, mobile devices (Laptop, Smart Phone, Tablet, and the like), sensors, meters, controls, instruments, monitors, Internet of Things (IoT) gear (watches, glasses, headphones, and the like), and the like. In various embodiments, these devices relate to specific applications such as vehicle applications (automobiles, self-driving vehicles, airplanes, and the like), and the like.

Figure 1B:
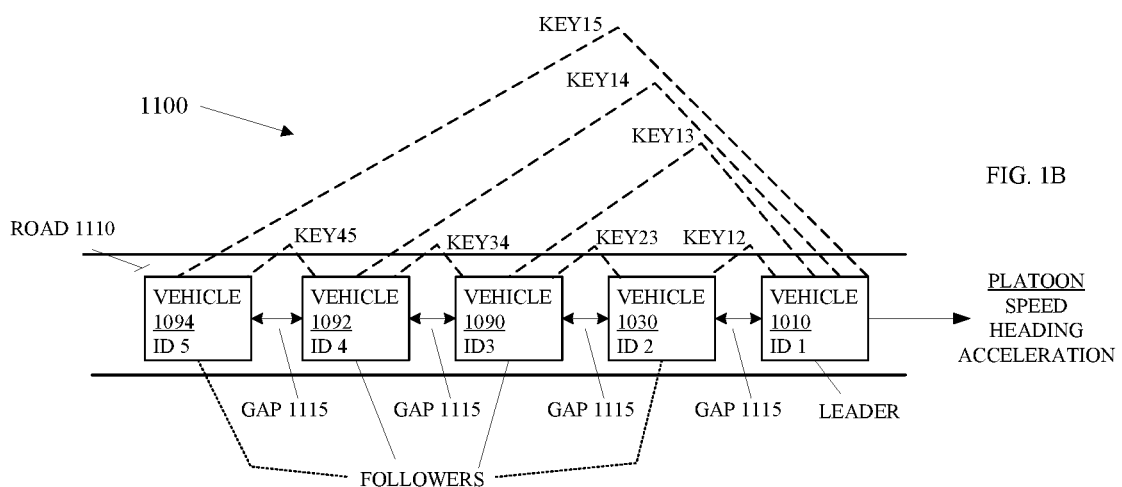
FIG. 1B depicts an embodiment of a platoon communication topology including five vehicles such as the vehicles illustrated in FIG. 1A.

Turning now to FIGS. 1A and 1B, FIG. 1A illustrates an embodiment 1000 of a wireless network 1000 to support vehicle-to-vehicle (V2V) communications for platooning. The plurality of vehicles 1010, 1030, 1090, 1092, and 1094 illustrate embodiments of wireless communications devices that are or can be installed in vehicles to facilitate communication of platoon data packets between vehicles as well as active or passive control of the vehicle operations such as acceleration, deceleration, braking, and/or steering. For the purposes of discussion, the wireless communications devices are labeled as "vehicles" to describe examples of functionality and operations for situations encountered during establishment, maintenance, and termination of platoons.

The vehicles 1010 and 1030 illustrate embodiments of wireless communications devices to install in cars, trucks or other vehicles to facilitate wireless V2V communications for platooning. The vehicles 1010 and 1030 comprise processor(s) 1001 and 1031, TSF timers 1005 and 1035, memory 1011 and 1041, platoon logic circuitry 1018 and 1048, wireless network interface 1022 and 1052, and an out-of-band network interface 1029 and 1059, respectively. Some embodiments do not include out-of-band network interfaces 1029 and 1059 or, at least, do not implement these out-of-band network interfaces 1029 and 1059 in the V2V communications for platooning. Other embodiments may implement the out-of-band network interfaces 1029 and 1059 to facilitate, e.g., exchanges of symmetric keys between the vehicles.

The platoon logic circuitry of the vehicles 1010, 1030, 1090, 1092, and 1094 such as the platoon logic circuitry 1018 and 1048 may comprise medium access control layer logic circuitry or a higher communication layer circuitry that operates with medium access layer logic circuitry to implement platoon initiation and security protocols for V2V communications. Platoon initiation and security protocols for V2V communications may differ based on the participants in the platoon 1100. If the platoon 1100 consists of vehicles that are part of or are members of an organization such as a corporation, the platoon initiation process may begin prior to vehicle movement and the security protocols may involve less or no privacy considerations as compared to an ad hoc platoon of vehicles currently operating on the road 1110 or ad hoc platoons of vehicles that are members of a platooning service. Furthermore, vehicles in an organization may have less vehicle-to-vehicle variations such as dimensions, acceleration capabilities, weight, braking capabilities, and the like, as compared to ad hoc platoons that may have to share more detailed information about each vehicle involved in the platoon.

Platoon initiation involves determining to form a platoon from a group of vehicles 1010, 1030, 1090, 1092, and 1094 on a road 1110 or that will be on the road 1110. Each vehicle that will participate in the platoon 1100 may receive and store a pairwise, symmetric key from two or more other vehicles that will participate in a platoon. The keys may facilitate security for communication of time-critical data packets between the vehicles. For instance, FIG. 1B illustrates an embodiment of a platoon 1100 of the vehicles 1010, 1030, 1090, 1092, and 1094 on a road 1110 driving from left to right. In the platoon 1100, the vehicle 1010 is the leader vehicle with a vehicle ID equal to one, the vehicle 1030 is a follower vehicle with a vehicle ID equal to two, the vehicle 1090 is the follower vehicle with a vehicle ID equal to three, the vehicle 1092 is a follower vehicle with a vehicle ID equal to four, and the vehicle 1094 is the follower vehicle with a vehicle ID equal to five. To initiate platoon 1100, the vehicles 1010, 1030, 1090, 1092, and 1094 may exchange or receive the pairwise, symmetric keys for other vehicles with which each will communicate.

In some embodiments, the leader vehicle 1010 communicates with each of the follower vehicles in the platoon 1100. In such embodiments, the vehicles 1010 and 1030 receive a key12 that is a pairwise, symmetric key shared by vehicles 1010 and 1030 to facilitate V2V communications. Similarly, the vehicles 1010 and 1090 receive a key13, the vehicles 1010 and 1092 receive a key14, and the vehicles 1010 and 1094 receive a key15. In other embodiments, the leader vehicle does not communicate with all the other vehicles in the platoon 1100. For example, each vehicle may communicate with adjacent vehicles. In other embodiments, the platoon 1100 may comprise a leader vehicle, one or more sub-leader vehicles, and one or more follower vehicles per sub-leader vehicle. In such embodiments, the leader vehicle may communicate with each of the sub-leader vehicles and each sub-leader vehicle may communicate with a different sub-group of follower vehicles with a platoon. In such embodiments, the leader vehicle 1010 may be a sub-leader of a larger platoon and follower vehicles 1030, 1090, 1092, and 1094 in platoon 1100 may comprise a sub-group of followers that are part of the larger platoon that includes two or more sub-leaders and, in some embodiments, a leader vehicle to communicate with and coordinate platoon movements of each of the sub-leader vehicles.

In the present embodiment, each of the vehicles 1010, 1030, 1090, 1092, and 1094 may also communicate with the preceding vehicle in the platoon 1100 so each of the adjacent vehicles receive pairwise, symmetric keys. In particular, the vehicles 1030 and 1090 receive a key23, the vehicles 1090 and 1092 receive a key34, and the vehicles 1092 and 1094 receive a key45. In some embodiments, the symmetric keys of the pair are identical. For instance, the vehicle 1010 may receive a key12 that is identical to the key12 that the vehicle 1030 receives.

The platoon logic circuitry of the vehicles 1010, 1030, 1090, 1092, and 1094 such as the platoon logic circuitry 1018 and 1048 may implement a platoon formation. The platoon formation involves a sequence of vehicle maneuvers to arrive at the desired platoon formation. The platoon logic circuitry may perform platoon formation through a series of vehicle movements in a manual, semi-autonomous, or autonomous fashion. The complexity of maneuvers that vehicles perform to form a platoon 1100 varies depending on the situation. For instance, forming a platoon from cars or trucks in a garage involves different actions than forming a platoon from vehicles already in motion on a road or highway.

In several embodiments involving ad hoc platoon formations, the leader vehicle 1010 of the platoon may be the vehicle in the forward-most position on the road 1110 and the platoon logic circuitry 1018 of the leader vehicle 1010 may coordinate and establish the platoon 1100 by coordinating a series of longitudinal and lateral vehicle maneuvers by each of the vehicles participating in the platoon 1100. In other embodiments, the platoon logic circuitry of the vehicles participating in the platoon 1100 may choose the leader vehicle 1010 based on other criteria such as the vehicle that can remain the leader vehicle throughout the existence of the platoon 1100 based on the destinations of the vehicles participating in the platoon 1100. As another example, an organization or platooning service may choose the leader based on the destinations of the vehicles or other criteria.

After forming the platoon 1100, the platoon logic circuitry 1018 may coordinate changes in the speed, direction, acceleration, deceleration, and braking of the platoon 1100. Furthermore, the platoon logic circuitry of each vehicle 1010, 1030, 1090, 1092, and 1094 participating in the platoon 1100 may handle its own basic safety maneuvers. In many embodiments, each of the follower vehicles 1030, 1090, 1092, and 1094 also provides updates to the leader vehicle 1010 and one or more of the other follower vehicles about their position, speed, acceleration, velocity, gap 1115, and/or the like. The gap 1115 is the distance between vehicles. For instance, the platoon logic circuitry 1048 of the vehicle 1030 may receive sensor data from sensors of the vehicle and may transmit a data packet such as the data packet 1300 shown in FIG. 1D to the leader vehicle 1010 and/or to the follower vehicle 1090.

The data packet 1300 may comprise fields such as a vehicle identifier (ID) 1310, a packet type 1320, and a payload 1330. The fields preceding the payload 1330 are generally referred to as the packet header. The vehicle ID 1310 field may include a value that uniquely identifies the vehicle that is transmitting the data packet 1300, referred to herein as the source vehicle. In further embodiments, the data packet 1300 may include a vehicle ID of the vehicle of the intended recipient of the data packet 1300 (referred to herein as the recipient vehicle) in the packet header. In some embodiments, the vehicle ID 1310 field may comprise a pseudonym to identify the source vehicle to preserve vehicle anonymity.

The packet type 1320 field may comprise a value to describe the type of the data packet 1300, the layer of a communications topology that generated the data packet 1300, and/or the task that generated the data packet 1300. For example, the data packet 1300 may include vehicle information of the source vehicle for a vehicle controller of the recipient vehicle, new gap information for a gap change task to be performed by the recipient vehicle, new gap information about the gap 1115 between the source vehicle and the recipient vehicle, a new speed and a new acceleration or deceleration task to adjust the speed of the platoon 1100, a new speed and/or acceleration of the source vehicle, and/or the like. The platoon logic circuitry of the recipient vehicle may then identify a priority for the data packet 1300 such as a time-critical data packet or a non-time critical data packet based on the value in the packet type 1320 field. Some embodiments include additional levels of priority for data packets.

The payload 1330 field may comprise one or more values to describe information about the vehicle or about the platoon such as a speed, a position, an acceleration, a heading, a driving space or gap 1115, an elevation, a steering wheel angle, a brake system status, a traction control status, a transmission state, a stability control status, a heading speed, a combination thereof, or the like. The content of the payload 1330 may depend on the task. The recipient vehicle of the data packet 1300 has the task of processing the data in the payload 1320 field, determining if data in the payload 1320 requires the recipient vehicle to make adjustments to longitudinal and/or lateral motion, and implementing, if necessary, adjustments to longitudinal and/or lateral motion in response to receipt and processing of the data packet 1300.

Prior to transmitting the data packet 1300, the platoon logic circuitry of the source vehicle may also generate and append some verification value or values. The verification may be a cryptographic validation of the validity and integrity of the data packet 1300. In many embodiments, the verification is based on the content of the whole data packet 1300 and not just the payload 1330.

Other data packets may include more fields, less fields, and/or different fields. For instance, some embodiments of the data packet 1300 include a timestamp. The timestamp is a value from a timing synchronization function (TSF) timer such as the TSF timer 1005 in the vehicle 1010 or the TSF timer 1035 in the vehicle 1030. The timestamp allows the vehicles to synchronize their TSF timers so that the vehicles can synchronize actions or tasks and can determine changes in, e.g., speed based on acceleration information from the time that a data packet is sent to the time that the data packet payload 1330 is processed.

The vehicles 1010 and 1030 may comprise processor(s) 1001 and 1031, and memory 1011, and 1041, respectively. The processor(s) 1001 and 1031 may comprise any data processing device such as a microprocessor, a microcontroller, a state machine, and/or the like, and may execute instructions or code in the memory 1011 and 1041. The memory 1011 and 1041 may comprise a storage medium such as Dynamic Random-Access Memory (DRAM), read only memory (ROM), buffers, registers, cache, flash memory, hard disk drives, solid-state drives, or the like. The memory 1011 and 1041 may store the keys such as the key12 and key23, frames, frame structures, frame headers such as the frame structure of the data packet 1300, communication topology information such as tasks and layers of communications associated with each of the tasks, or the like, and may also comprise platoon code for platoon logic circuitry 1018 and 1048, respectively.

The TSF timer, such as TSF timers 1005 and 1035 in FIG. 1A, may reside in a chipset of the vehicle such as vehicle 1010 and 1030 or may reside elsewhere in the vehicle.

The lead vehicle 1010 may transmit, e.g., a beacon or heartbeat as a data packet 1300 or as part of a payload 1330 in a data packet 1300 such as a longitudinal and lateral motion information periodically and capture the value in the timing synchronization function (TSF) timer at the time of, concurrent with, or contemporaneous with, transmission to include in the payload 1330, or a frame body, of the data packet as the timestamp. A vehicle, such as the vehicle 1030 in FIG. 1A, may receive the beacon via the wireless network interface 1052 and may correct the TSF timer 1035 for the vehicle 1030. The correction of the TSF timer 1035 for the vehicle 1030 synchronizes the vehicle with the leader vehicle 1010 and the other vehicles participating in the platoon 1100 by updating the value in the TSF timer 1035.

The platoon logic circuitry 1018 and 1048 may comprise one or more circuits to implement platoon tasks and/or platoon maintenance. The platoon logic circuitry 1018 and 1048 may comprise one or more processors to execute platoon layer code stored in the memory 1011 and 1041, respectively. In other embodiments, the platoon logic circuitry 1018 and 1048 may comprise interface circuitry to execute code on the one or more processors 1001 and 1031, respectively.

The platoon logic circuitry 1018 and 1048 may communicate with the medium access control (MAC) layer and the physical layer (PHY) logic circuitry of wireless network interfaces 1022 and 1052, respectively, to transmit a PHY frame such as an acknowledgement (ACK) or a data packet 1300 in a PHY frame to transmit to the vehicle 1030 and the vehicle 1010, respectively.

After processing the PHY frame, radios 1026 and 1056, each comprising an RF transmitter and an RF receiver, may impress digital data onto subcarriers of RF frequencies for transmission by electromagnetic radiation via elements of an antenna array or antennas 1028 and 1058, respectively. The RF receiver receives electromagnetic energy, extracts the digital data, and decodes the data packet 1300.

The platoon logic circuitry 1018 and 1048 may comprise a vehicle controller 1020 and 1050, respectively. Each vehicle in the platoon 1100 comprises a vehicle controller such as the vehicle controllers 1018 and 1048. These vehicle controllers process data (or information) about the vehicle within which they reside, data about one or more other vehicles participating in the platoon 1100, and data about the leading vehicle or more generally about the platoon 1100. With this data, the vehicle controllers such as the vehicle controllers 1018 and 1048 may output signals to adjust the longitudinal and lateral movement of the corresponding vehicle and optionally inform a task generator of the platoon logic circuitry about the adjustments. The output signals to adjust the longitudinal and lateral movement of the vehicle may automatically perform all the adjustments.

Figure 1C:
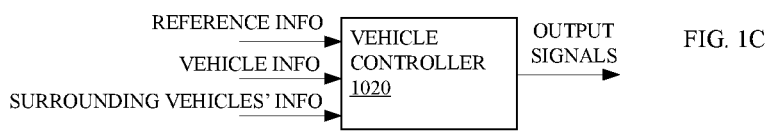
FIG. 1C depicts an embodiment of a vehicle controller such as the vehicle controller illustrated in FIG. 1A.

FIG. 1C illustrates an embodiment of a vehicle controller 1020 and is generally representative of vehicle controllers in each of the vehicles participating in the platoon 1100. In many embodiments, platoon logic circuitry can maintain the stability of the platoon by providing the vehicle controller 1020 with reference information, information of the vehicle itself, and information about the surrounding cars participating in the platoon. Information for the vehicle itself and for one or more surrounding vehicles may include position, speed, velocity, acceleration, heading, road curvature, vehicle dimensions, steering wheel angle, gaps, transmission state, brake system status, traction control status, stability control status, and/or the like. The reference information for the vehicle controller 1020 may include the target speed for the platoon 1100 and the target gap 1115 between the vehicle and other vehicles participating in the platoon 1100 such as the adjacent vehicles directly in front and behind. The vehicle controller 1020 may determine information about the vehicle itself as sensor data from sensors in the vehicle or data about the vehicle stored in the memory 1011. The vehicle controller 1020 may determine information about the other vehicles from data in the payload of a data packet such as the data packet 1300.

The basic information that the vehicle controller 1020 may require about the surrounding vehicles' is a position, a speed, and an acceleration. The vehicle controller 1020 may also require the information about a subset of the other vehicles in the platoon 1100. The particular set of vehicles may depend on the communication topology implemented for the platoon 1100 or that is assumed when the vehicle controller 1020 is designed. FIG. 1B illustrates one example of a communications topology 1100 that assumes a one plus leader look ahead communication topology. Other communication topologies include a one-look ahead, a one-plus leader look ahead with sub-platoons, an R-look ahead, and a bi-directional. In the one-look ahead communication topology, each vehicle receives information about the vehicle directly in front of it. In the one-plus leader look ahead communication topology, each vehicle receives information about the vehicle directly in front of it and from the leader vehicle. In the one-plus leader look ahead with sub-platoons communication topology, each vehicle receives information about the vehicle directly in front of it and from a sub-leader and each sub-leader receives information from the leader vehicle. In the R-look ahead communication topology, each vehicle receives information about R vehicles in front of it. In the bi-directional communication topology, each vehicle receives information about the vehicles in front of and behind it.

To ensure the safety of the vehicle, the platoon logic circuitry of each of the vehicles periodically transmit basic safety messages (BSMs) to the vehicle controllers in each of the vehicles 1010, 1030, 1090, 1092, and 1094 participating in the platoon 1100 in accordance with the communication topology. The BSMs are standardized data packets such as the data packet 1300 that include at least the basic information required to maintain safety of the vehicles participating in the platoon 1100 such as the speed, position, and acceleration. In many embodiments, the platoon logic circuitry of each of the vehicles transmits, receives, and decodes the BSMs within 100 milliseconds. Each following vehicle, when using one-plus leader look ahead communication topology, receives at least two BSMs and transmits at least one BSM within the 100 milliseconds. The leader vehicle 1100 may transmit one packet to all the vehicles, which requires additional time to generate verification information, and may receive packets from each of the vehicles 1010, 1030, 1090, 1092, and 1094 within the platoon 1100 within 100 milliseconds depending on the communications topology implemented. In many embodiments, the E2EL of the BSMs is less than 100 milliseconds. Experimental evaluations of these systems suggest that an information refresh rate of 10 Hz (hertz) can ensure stability of platoon 1100 via the vehicle controllers such as 1020 and 1050.

Figure 1D:
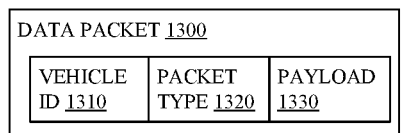
FIG. 1D depicts an embodiment of a data packet to transmit vehicle information such as the vehicle controller illustrated in FIG. 1A.
Figure 1E:
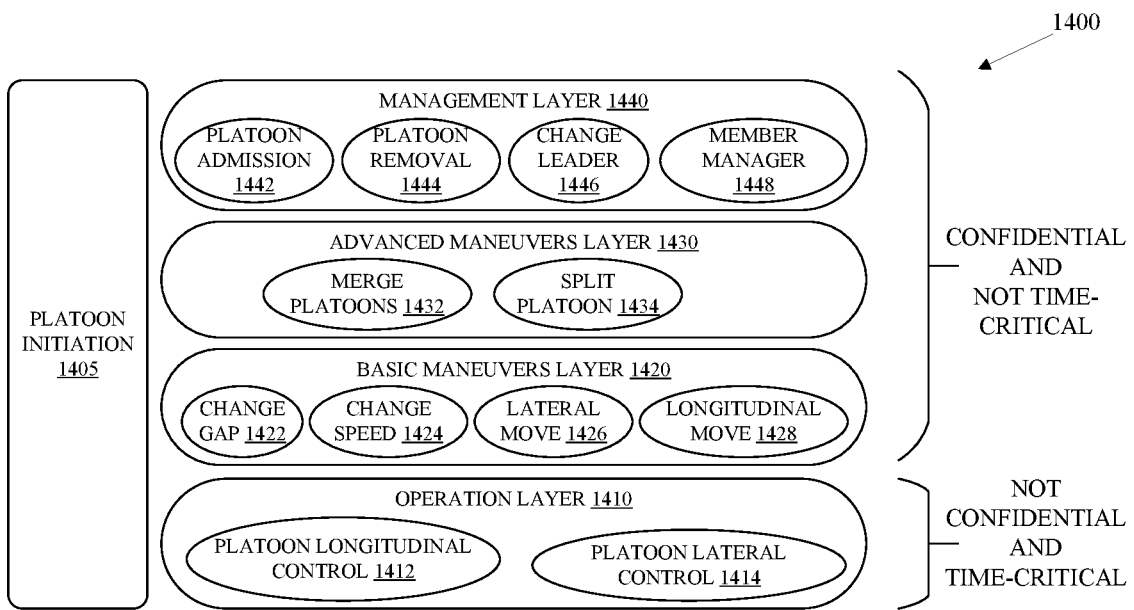
FIG. 1E depicts an embodiment of platooning application architecture to support vehicle-to-vehicle communications for platooning such as the platoon illustrated in FIG. 1B.

FIG. 1E illustrates an embodiment of platoon application architecture that supports vehicle-to-vehicle communications for platooning such as the platoon 1100 illustrated in FIG. 1B. The platoon architecture 1400 includes multiple layers of logical operations or tasks to control movements of the vehicles in the platoon 1100. Each layer represents a set of one or more tasks that the platoon logic circuitry of each vehicle may perform. Furthermore, the platoon logic circuitry of each vehicle may communicate information related to each of the tasks to one or more other vehicles participating in the platoon 1100 to facilitate safety and to facilitate formation and maintenance of the platoon 1100.

The platoon architecture 1400 includes a Platoon Initiation Layer 1405, an Operation Layer 1410, a Basic Maneuvers Layer 1420, an Advanced Maneuvers Layer 1430, and Management Layer 1440. A leader vehicle 1010 or sub-leader vehicle may initiate more complex tasks or all tasks above the Operation Layer 1410. Each vehicle participating in the platoon may initiate Operation Layer 1410 tasks to maintain a target speed, a target acceleration, and target gaps for the platoon 1100. Under special circumstances, a non-leader vehicle may also initiate tasks above the Operation Layer 1410. For example, when a traffic light turns from green to red when only part of a platoon cross the intersection successfully and the rest was blocked and separated. The tail end of the platoon would be forced to initiate a "split" operation temporarily.

The Operation Layer 1410 includes tasks to control or adjust a vehicle's longitudinal and lateral motion. The other layers support more complex movements that the platoon logic circuitry can implement with multiple longitudinal and/or lateral vehicle adjustments coordinated by one or more of the vehicles participating in the platoon 1100. In many embodiments, vehicles in a platoon 1100 complete the more complex movements in multiple stages of longitudinal and lateral adjustments of one or more vehicles in the platoon 1100. In several embodiments, the leader vehicle 1010 or sub-leader vehicle initiates more complex movements by transmitting data packets with longitudinal and lateral adjustments for each stage, waiting for receipt of a data packet to confirm completion from each affected vehicle in each stage, and then transmitting longitudinal and lateral adjustments for a subsequent stage. In many embodiments, the packet type in each of the data packets distinguishes basic safety messages (BSMs) initiated via the Operation Layer 1410 from more complex tasks initiated by other layers that include Operation Layer 1410 sub-tasks.

The Platoon Initiation Layer 1405 tasks may form a platoon from a set of arbitrary vehicles either on the road or at rest by negotiating the formation of the platoon among the platoon logic circuitry of each of the vehicles. In other embodiments, the Platoon Initiation Layer 1405 communications may involve receiving instructions from an organization or platoon service that designates a platoon formation among a set of vehicles rather than negotiating the formation. In further embodiments, an organization may instruct the formation of a platoon and the vehicles participating in the platoon may negotiate some of or all the remaining details about the platoon formation via the Platoon Initiation Layer 1405 tasks and communications.

The Operation Layer 1410 may include tasks to maintain an appropriate longitudinal and lateral motion of the platoon 1100. In many embodiments, the Operation Layer 1410 includes tasks to adjust and to communicate adjustments of a position, a speed, and an acceleration for the platoon, the vehicle itself, and the surrounding vehicles. The vehicle controller of each vehicle may process data packets for the Operation Layer 1410 ten times per second.

The Operation Layer 1410 may comprise a Platoon Longitudinal Control 1412 task and a Platoon Lateral Control 1414 task. The Platoon Longitudinal Control 1412 task involves adjustments to a vehicle's speed and gap to maintain a target speed and target gap for the platoon or a target speed and gap that the leader vehicle 1010 designates for the vehicle or a sub-group of vehicles participating in the platoon 1100. The platoon logic circuitry of a vehicle may perform a task such as the Platoon Longitudinal Control 1412, transmit a data packet with data or a bit in the header to confirm of completion of the task to the leader vehicle, and transmit a data packet with information about the task to one or more vehicles in the platoon depending on the communication topology. The Platoon Lateral Control 1414 task involves adjustments to keep the vehicle centered in the lane unless a lane change is being requested by the higher layer (e.g. Lateral Move 1426). To implement more advanced maneuvers, one or more vehicles' speed and gap may change relative to the targets for the platoon, and such maneuvers are being initiated by the layers above Operation Layer 1410.

The Basic Maneuvers Layer 1420 may include tasks to implement simple maneuvers that a platoon 1100 may perform. In many embodiments, invoking a task in this layer involves the execution of some tasks in the Operation Layer 1410. The Basic Maneuvers Layer 1420 may include a Change Gap 1422 task, a Change Speed 1424 task, a Lateral Move 1426 task, and a Longitudinal Move 1428 task. The Change Gap 1422 task may change all or some of the gaps 1115 between vehicles in the platoon 1100. The platoon logic circuitry of the affected vehicles may receive a Change Gap 1422 task from the leader vehicle 1010 and may execute or attempt to execute the change. If the platoon logic circuitry is able to perform the change toward the new gap, the platoon logic circuitry may respond with a data packet 1300 that indicates that the change is complete. If the platoon logic circuitry is not able to perform the change to the new gap, the platoon logic circuitry may respond with a data packet 1300 that indicates that the change failed. In some embodiments, the response may also include information about the failure such as a safety override, a manual override, a driver failed to respond, and/or the like in the payload 1330 of the data packet 1300.

The change speed 1424 task may involve changing the speed of one or more vehicles in the platoon 1100. The platoon logic circuitry of the affected vehicles may receive a change speed 1424 task from the leader vehicle 1010 and may execute or attempt to execute the change. If the platoon logic circuitry is able to perform the change to the new speed, the platoon logic circuitry may respond with a data packet 1300 that indicates that the change is complete. If the platoon logic circuitry is not able to perform the change to the new speed, the platoon logic circuitry may respond with a data packet 1300 that indicates that the change failed. In some embodiments, the response may also include information about the failure such as a safety override, a manual override, a driver failed to respond, and/or the like.

The Lateral Move 1426 task may involve changing the left-to-right positioning of one or more vehicles in the platoon 1100 such as to change lanes on the road 1110 or to prepare for splitting the platoon. The platoon logic circuitry of the affected vehicles may receive a Lateral Move 1426 task from the leader vehicle 1010 and may execute or attempt to execute the change. If the platoon logic circuitry is able to perform the lateral move, the platoon logic circuitry may respond with a data packet 1300 that indicates that the move is complete. If the platoon logic circuitry is not able to perform the lateral move, the platoon logic circuitry may respond with a data packet 1300 that indicates that the lateral move failed. In some embodiments, the response may also include information about the failure such as a safety override, a manual override, a driver failed to respond, and/or the like.

The Longitudinal Move 1428 task may involve changing an acceleration of one or more vehicles in the platoon 1100 in the longitudinal direction. The platoon logic circuitry of the affected vehicles may receive a Longitudinal Move 1428 task from the leader vehicle 1010 and may execute or attempt to execute the change. If the platoon logic circuitry is able to perform the Longitudinal Move 1428, the platoon logic circuitry may respond with a data packet 1300 that indicates that the move is complete. If the platoon logic circuitry is not able to perform the Longitudinal Move 1428, the platoon logic circuitry may respond with a data packet 1300 that indicates that the longitudinal move failed. In some embodiments, the response may also include information about the failure such as a safety override, a manual override, a driver failed to respond, and/or the like.

The Advanced Maneuvers Layer 1430 may include tasks that implement a collection of advanced maneuvers by the platoon 1100. Typically, invoking a task in this layer involves the execution of tasks from the lower layers. The Advanced Maneuvers Layer 1430 may include tasks such as Merge Platoons 1432 and Split Platoons 1434. The Merge Platoons 1432 task may involve merging the platoon 1100 with a second platoon. The platoon logic circuitry of the leader of the second platoon may receive a Merge Platoons 1432 task from the leader vehicle 1010 and may execute or attempt to execute the merger. The platoon logic circuitry of leader of the second platoon may act thereafter as a sub-leader of the leader vehicle 1010 or may transmit a new leader designation to the follower vehicles in the second platoon. If the platoon logic circuitry of the leader of the second platoon is able to merge the platoons, the platoon logic circuitry may respond with a data packet 1300 that indicates that the merger is complete. If the platoon logic circuitry of the leader of the second platoon is not able to perform the merger, the platoon logic circuitry may respond with a data packet 1300 that indicates that the platoon merger failed. In some embodiments, the response may also include information about the failure such as a safety override, a manual override, a driver failed to respond, and/or the like. In several embodiments, the Merge Platoons 1432 task may involve instructions by the leader vehicle 1010 to a follower vehicle such as the last follower vehicle 1094 to relay a data packet 1300 or other communication to the leader of the second platoon to facilitate communications between the leader vehicles of the two platoons when the leader of the second platoon is out of the range of the wireless network interface 1022.

The Split Platoons 1434 task may involve breaking the platoon 1100 into two or more sub-platoons. The platoon logic circuitry of new sub-platoon leader(s) may receive a Split Platoons 1434 task from the leader vehicle 1010 and may execute or attempt to execute the split. The platoon logic circuitry of affected follower vehicles may also receive a new leader designation in the form of the data packet 1300. If the platoon logic circuitry of the new sub-leader is able to split the platoons, the platoon logic circuitry may respond with a data packet 1300 that indicates that the split is complete. If the platoon logic circuitry of the new sub-leader is not able to perform the split platoons 1434 task, the platoon logic circuitry may respond with a data packet 1300 that indicates that the platoon split failed. In some embodiments, the response may also include information about the failure such as a safety override, a manual override, a driver failed to respond, and/or the like.

The Management Layer 1440 may contain tasks that are primarily focused on the management of the platoon 1100. Typically, invoking a task in this layer involves the execution some tasks from the lower layers. The Management Layer 1440 may comprise tasks such as Platoon Admission 1442, Platoon Removal 1444, Change Leader 1446, and Member Manger 1448. The platoon logic circuitry 1018 of a leader vehicle 1010 may perform the management layer tasks. The Platoon Admission 1442 task may involve, for example, receiving a join request from a vehicle, determining if joining the vehicle will exceed a maximum platoon size, determining if other safety conditions are satisfied, and determining if traffic management considerations are satisfied. If the platoon logic circuitry 1018 determines to join the new vehicle, the platoon logic circuitry 1018 may execute a Merge Platoons command 1432.

The Platoon Removal 1444 task may involve removing one or more vehicles from the platoon 1100. The platoon logic circuitry 1018 may determine if the conditions allow safe removal of the vehicle from the platoon 1100 and, if so, invoke lower layer communications, as necessary, to remove the vehicle from the platoon 1100.

The platoon logic circuitry 1018 may implement a Change Leader 1446 task to, e.g., allow the leader vehicle 1010 to leave the platoon 1100 or to switch leader vehicles. The platoon logic circuitry 1018 of the leader vehicle 1010 may determine one or more factors such as safety conditions of the platoon 1100, traffic management issues, and trip information issues. If the platoon logic circuitry 1018 determines that the task is acceptable, the platoon logic circuitry 1018 of the leader vehicle 1010 may execute one or more lower layer tasks to perform the change and transmit new leader designations to the follower vehicles.

The platoon logic circuitry 1018 may implement a Member Manager 1448 task to, e.g., change the size of the platoon 1100 if road conditions or traffic conditions raise safety concerns about maintaining the current platoon size. For example, if the platoon 1100 is split by the change of one or more traffic lights, the platoon logic circuitry 1018 may determine to split the platoon 1100 or disband the platoon.

Different layers of the platoon architecture 1400 may raise different security issues. Generally, communications of information such as the information in BSMs in the Operation Layer 1410 are not confidential because the information (position, speed, acceleration, etc.) can easily be observed by other vehicles on the road including but not limited to those in the platoon 1100, and so confidentiality of such information is not deemed critical. On the other hand, those messages are time-critical to maintain the stability of the platoon and safety of the vehicles in the platoon 1100. Integrity of such messages is of highest importance so that messages are not easily being spoofed. Higher layer tasks such as the Basic Maneuvers Layer 1420, Advanced Maneuvers Layer 1430, and Management Layer 1440 tasks can involve a sequence of lower level tasks as well as task completion confirmations. As such, these higher layer tasks are subject to disruptions caused by other vehicles on the road, road users and external factors such as traffic light change at intersections, etc., and so are inherently not time-critical. For instance, a Merge Platoons 1432 task may be thwarted by a near-by vehicle that interferes with the one or more of the stages involved with performing the merge platoons 1432 task. Similar to information in data packets related to operation layer tasks, integrity is also important for these higher layer messages so that messages are not being spoofed to cause unsafe maneuver. In addition, confidentiality may be important as well at least for a subset of these operations. For example, sensitive information, such as trip destination, may be needed in order for a car to join a platoon, but such information should not be shared widely with any cars. To share the economic benefit of fuel saving among platoons, financial account information may also need to be shared among the platoon members and clearly confidentiality of such information must be protected.

FIGS. 1F-G depict embodiments of data packet security for transmission of time-critical and non-time-critical messages such as the data packets discussed in conjunction with FIG. 1A. FIG. 1F illustrates an embodiment 1500 of a MAC computation and verification security protocol for time-critical data packets. The time-sensitive or time-critical data packets are the data packets required by the vehicle controller such as the vehicle controller 1020 shown in FIG. 1A to maintain a basic level of safety and stability for each vehicle participating in the platoon 1100. Assuming a leader-plus-preceding communication topology for this embodiment, the two types of data packets that the platoon logic circuitry of each vehicle may generate includes a data packet 1300 from a vehicle to the vehicle behind it and a data packet 1300 from the leader vehicle 1010 to all vehicles in the platoon 1100. The follower vehicles may also transmit a confirmation in the form of a data packet 1300.

For time-sensitive data packets, the platoon logic circuitry of each vehicle 1010, 1030, 1090, 1092, and 1094 in the platoon 1100 may implement a verification technique that employs a MAC algorithm with a hash function such as SHA3-256, which is based on the use of symmetric keys. By doing so, this architecture avoids the use of time-expensive digital signatures and therefore encoding/decoding times are in the order of 1 millisecond, according to a benchmark performance evaluation. This architecture assumes the distribution of pairwise symmetric keys between vehicles participating in the platoon 1100, such as the keys shown in FIG. 1B, including one pairwise key between every vehicle and the vehicle behind it and one pairwise key between the leading vehicle 1010 and every vehicle 1030, 1090, 1092, and 1094 participating in the platoon 1100.

In FIG. 1F, the encoding process 1500 is part of the MAC computing process and begins with generating or receiving a data packet 1505 to transmit such as the data packet 1300 shown in FIG. 1D. If the data packet 1505 does not break evenly into a number of blocks for the MAC algorithm, the platoon logic circuitry may pad the data packet 1505 to raise the bytes from, e.g., 50 bytes, to a number of bytes compatible with the MAC computing process such as 64 bytes.

After padding the data packet 1505 to create the data packet plus padding 1510, the platoon logic circuitry may perform a cryptographic hash in accordance with, e.g., Keccak SHA3-256, with a pairwise key for the intended recipient or destination vehicle. If the platoon logic circuitry is in the leader vehicle 1010 and the leader is sending the same message (e.g., broadcasting) to every vehicle in the platoon, the platoon logic circuitry 1018 may create a single multi-cast packet to the whole platoon with separate MAC for each vehicle in the platoon 1100 using their corresponding keys. In many embodiments, the platoon logic circuitry generates the MAC by applying a MAC algorithm (e.g., using Keccak SHA3-256 as the hash function) with the pairwise symmetric key k on the padded data packet m.

For instance, a MAC 1530 for a data packet plus padding 1510 to transmit from the platoon logic circuitry 1018 of the leader vehicle 1010 to the follower vehicle 1030 may use the key12 as shown in FIG. 1B. If the platoon logic circuitry 1018 transmits the data packet plus padding 1510 to all the vehicles in the platoon 1100, the platoon logic circuitry 1018 may append a MAC for each vehicle. The MAC for the vehicle 1090 is created using the key13, the MAC for the vehicle 1092 is created using the key14, and the MAC for the vehicle 1094 is created using the key15. The MAC 1535 represents the MAC for the last vehicle 1094 in the platoon 1100.

The decoding process part of the verification process. The platoon logic circuitry of the recipient vehicle receives the data packet plus padding 1510 along with the MACs 1530 through 1535 for each of the vehicles in the platoon 1100. The platoon logic circuitry of the recipient vehicle may be able to determine which MAC relates to it based on the order of the MACs or by another method to avoid additional time expenditures to decode all the MACs. For data packets from one vehicle to the following vehicle such as vehicle 1030 to vehicle 1090, the platoon logic circuitry of the source vehicle may transmit the data packet plus padding 1510 with a single MAC.

If the MAC verifies the data packet plus padding 1510, the platoon logic circuitry may remove the padding and process the data packet 1505 by passing the payload 1330 to a vehicle to the controller. If the platoon logic circuitry is unable to verify the data packet plus padding with the MAC, the data packet is discarded.

FIG. 1G illustrates an embodiment 1600 of encryption/signing and decryption/verification security protocol for non-time-critical data packets. The encoding process begins with the platoon logic circuitry of the source vehicle signing a data packet 1605, e.g., using the Elliptic Curve Digital Signature Algorithm (ECDSA) to create a digital signature 1615. The ECDSA is a digital signature mechanism based on the elliptic curve discrete logarithm problem and standardized in Federal Information Processing Standard (FIPS) 186-4. Then, the public key is authenticated by the use of a certificate 1620.

To implement confidentiality, the platoon logic circuitry may also encrypt the data packet 1605 together with the signature 1615 to create encrypted data packet 1610. In many embodiments, the platoon logic circuitry performs encryption operation using Advanced Encryption Standard (AES) symmetric key encryption. In some embodiments, the payload of the data packet is encrypted to preserve confidentiality but the header of the data packet is not encrypted to facilitate identification of data packets by recipient vehicles. If the symmetric keys used for data encryption are not available at the recipient, then the symmetric key is encrypted using a public key encryption scheme such as the Elliptic Curve Integrated Encryption Scheme (ECIES). ECIES is a public-key encryption mechanism based on the elliptic curve discrete logarithm problem. Then, the public key is authenticated by the use of a certificate 1620.

The platoon logic circuitry of the source vehicle may transmit the encrypted data packet 1610 with the digital signature 1615 and the certificate 1620 to a recipient vehicle. And the decoding process begins with the platoon logic circuitry of the recipient vehicle verifying the certificate such as via a third-party certificate authority and, in some embodiments, via an out-of-band network interface such as the out-of-band network interface 1059 of vehicle 1030 in FIG. 1A.

The platoon logic circuitry of the recipient vehicle may then decrypt the encrypted data packet 1610 to obtain the data packet 1605 and the digital signature 1615. Then the platoon logic circuitry of the recipient vehicle may verify the digital signature 1615 with the public key carried in the certificate 1620. If the platoon logic is unable to verify the digital signature, the data packet is discarded.

Figure 2:
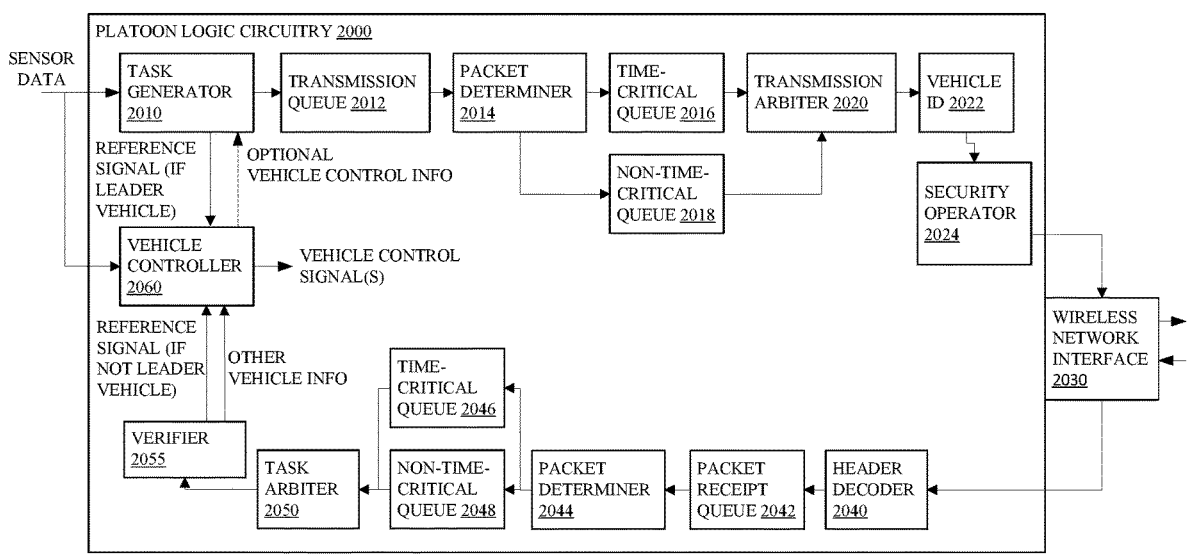
FIG. 2 depicts an embodiment of an apparatus to support vehicle-to-vehicle communications for platooning.

FIG. 2 depicts an embodiment of a platoon logic circuitry 2000 to support vehicle-to-vehicle communications for platooning. The platoon logic circuitry 2000 comprises a task generator 2010 to generate tasks and the corresponding messages such as those shown in the architecture 1400 in FIG. 1E. In many embodiments, the task generator 2010 may output a reference signal to a vehicle controller 2060 including, e.g., a platoon or target speed and a platoon or target gap. In other embodiments, the reference signal may comprise information received via a wireless network interface 2030 such as the wireless network interface 1052 illustrated in FIG. 1A.

The task generator 2010 may output a data packet to a transmission queue 2012. The transmission queue 2012 may comprise a buffer to hold the data packet until a packet determiner 2014 determines if the data packet comprises a time-critical data packet. In several embodiments, the packet determiner 2014 determines if the data packet is time-critical by determining a value included in a packet type field of the data packet such as the data packet 1300 shown in FIG. 1D. Data packets that include a packet type that is associated with the operation layer 1410 are time-critical.

The packet determiner 2014 may move the time-critical data packets into the time-critical queue 2016 and may move the non-time critical data packets into a non-time-critical queue 2018 to await transmission. A transmission arbiter 2020 may select data packets from the time-critical queue 2016 and from the non-time-critical queue 2018 to transmit. The transmission arbiter 2020 may give a priority to time-critical data packets to ensure an E2EL that is less than, e.g., 100 milliseconds.

The packet determiner 2014 may output a data packet from one of the queues to a vehicle ID 2022. The vehicle ID 2022 may add the vehicle ID for the platoon logic circuitry 2000 to the data packet to identify the source vehicle of the data packet. In other embodiments, the vehicle ID 2022 may also add a vehicle ID for the recipient vehicle of the data packet.

After adding the vehicle ID, a security operator 2024 may perform a security operation so a recipient vehicle can verify that the content of the data packet is valid and is from a valid source. For non-time-critical packets, the security operation may generate a digital signature, optionally encrypt the data packet, and, in some embodiments, append a certificate. For time critical data packets, the security operator 2024 may optionally add padding and may generate one or more MACs by using a MAC algorithm with a hash function such as Keccak.

After the security operation, the wireless network interface 2030 may transmit the data packet to one or more recipient vehicles.

The wireless network interface 2030 may also include a wireless receiver to receive data packets from other vehicles. The wireless network interface 2030 may pass a data packet that it receives from another vehicle to a header decoder 2040. If the data packet is a time-critical packet, the data packet may not be encrypted so the header decoder 2040 may determine if the data packet is from the platoon within which the platoon logic circuitry 2000 participates and if the data packet is from a vehicle within the platoon from which the platoon logic circuitry 2000 expects to receive a data packet. In some embodiments, the header decoder 2040 may determine both based on the header of the packet including the vehicle ID value and the packet type value. The header decoder 2040 may determine that the data packet is from the correct platoon based on the vehicle ID and the packet type matching corresponding vehicle and task of the correct platoon. In other embodiments, the header decoder 2040 may determine if the data packet is from the correct platoon based on other information included in the data packet or based on the on the MAC. If the data packet is from the correct platoon and from a vehicle from which the platoon logic circuitry expects to receive a data packet, the platoon logic circuitry 2000 determines that the packet should be decoded and passes the data packet to the packet receipt queue 2042. If the data packet is not from the correct platoon and from a vehicle from which the platoon logic circuitry expects to receive a data packet, then the data packet is discarded.

If the data packet is non-time critical, the data packet may be encrypted and the header decoder 2040 may pass the data packet to the packet receipt queue 2042.

The packet receipt queue 2042 may buffer the data packet until a packet determiner 2044 determines if the data packet is time-critical. If the data packet is time-critical such as a BSM, the packet determiner 2044 may move the data packet into the time-critical queue 2046. If the data packet is not time critical or is encrypted, the packet determiner 2044 may move the data packet into the non-time-critical queue 2048.

After the data packets are moved into the time-critical queue 2046 or the non-time-critical queue 2048, a task arbiter 2050 may assure E2EL processing of the time-critical data packets by giving data packets in the time-critical queue 2046 a higher priority than data packets in the non-time-critical queue 2048 while continuing to process the non-time-critical data packets. Upon selecting a data packet, the task arbiter 2050 may pass the data packet to a verifier 2055.

The verifier 2055 may verify a MAC if the data packet is time sensitive or decrypt the encrypted packet and then verify a certificate and a digital signature if the data packet is non-time-critical. After all the verifications, the verifier 2055 passes the payload to the vehicle controller 2060 to perform the task(s). In some embodiments, the verifier 2055 informs the task generator about adjustments made in response to tasks. If the verifier 2055 does not verify the data packet, the data packet is discarded.

Figure 3B:
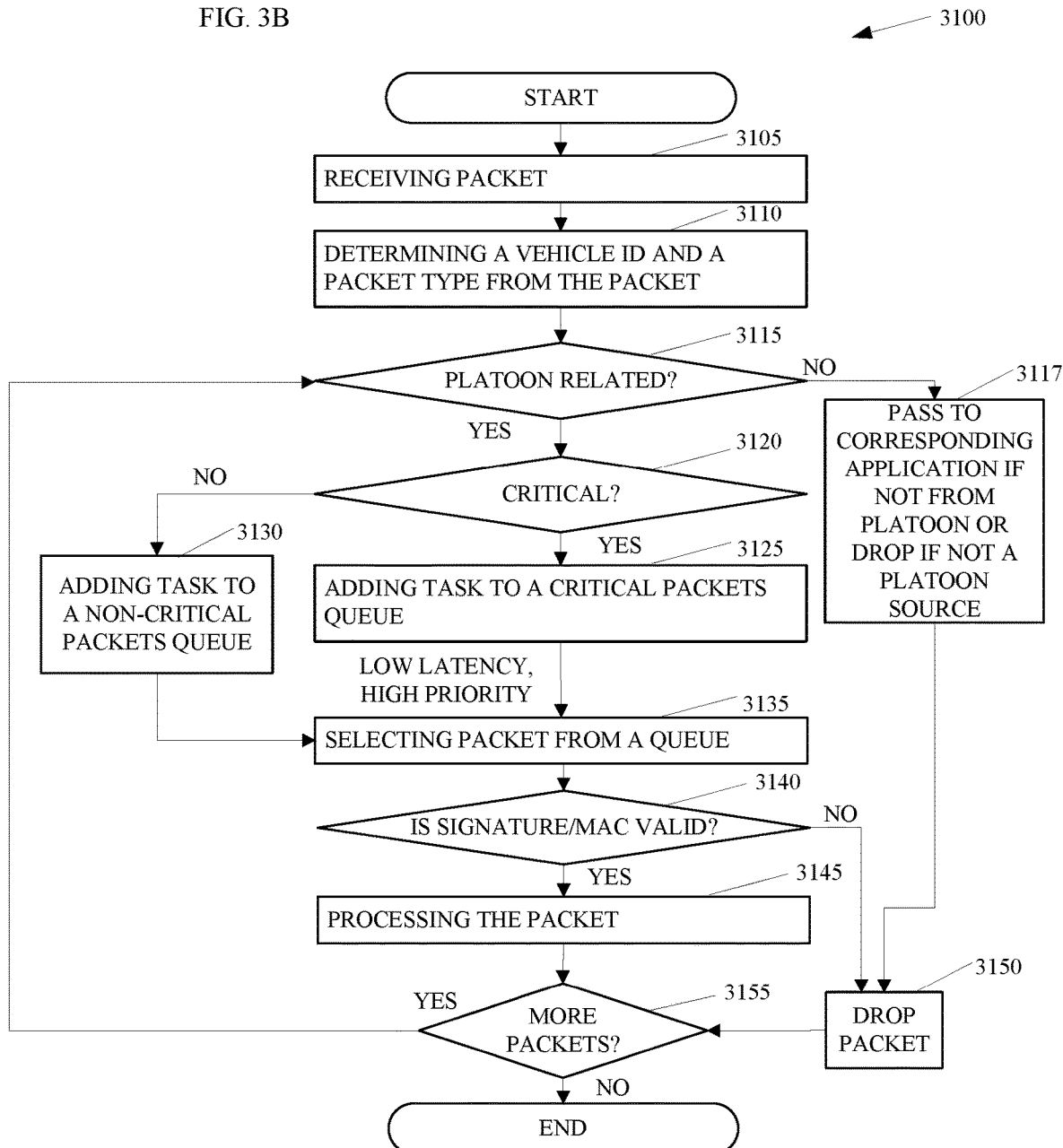

FIGS. 3A-B depict embodiments of flowcharts to encode and decode vehicle-to-vehicle communications for platooning. FIG. 3A shows the flowchart 3000 for the encoding process of data packets for V2V communications for platooning. The flowchart 3000 begins with determining a data packet to transmit (element 3005). The platoon logic circuitry of each vehicle may submit data related to each task completed or being performed by the vehicle in a data packet for transmission. The platoon logic circuitry also identifies each data packet or task as "time-critical" or not. In some embodiments, the data packet is marked as time-critical or not based on the packet type included in the data packet. In other embodiments, the platoon logic circuitry may include a different bit in the packet header to indicate if the data packet includes data related to a time-critical task or not.

After generating a data packet, the platoon logic may add the data packet to a time-critical queue (element 3015) if the task represented by the data packet is time-critical (element 3010) and add the data packet to a non-time-critical queue (element 3020) if the task is not time-critical (element 3010). The platoon logic circuitry may process data packets added to the time-critical queue at a higher rate than data packets added to the non-time-critical queue.

The platoon logic circuitry may select and remove the data packets from both critical and non-critical queues (element 3025) with an appropriate rate that ensures an end-to-end latency (E2EL) for the time-critical data packets. The time-critical packets are sent frequently enough and the non-critical packets are not stalled indefinitely. In some embodiments, the platoon logic circuitry dynamically adjusts the rates based on measured E2EL rates and/or heuristically learns appropriate rates.

Once the platoon logic circuitry selects a data packet for transmission, the platoon logic circuitry may append a vehicle ID to the data packet to identify the source vehicle of the data packet (element 3030). The platoon logic circuitry also signs the data packet (element 3035). If the data packet is time-critical, the platoon logic circuitry may compute MAC for the data packet using a MAC algorithm with a hash function (SHA3 for example) and append the MAC to the data packet. In many embodiments, the platoon logic circuitry adds padding as necessary to the data packet to increase the size of the data packet to a size that breaks into an even number of blocks for the MAC computations. Furthermore, if the vehicle is a leader or sub-leader, the platoon logic circuitry may compute multiple MACs for the data packet (each MAC is computed using the symmetric key for each of the vehicles within the platoon or sub-platoon) and append the resulting MACs to the data packet. In several embodiments, the platoon logic circuitry appends the MACs for the vehicles participating in the platoon in the same order each time so that the recipient vehicles can determine the MAC corresponding to their respective keys based on the order of the MACs. In some embodiments, the order of the MACs is based on an ascending or descending order of the vehicle IDs associated with the vehicles participating in the platoon.

If the data packet is non-time-critical, the platoon logic circuitry may generate a digital signature and encrypt the data packet. In some embodiments, the platoon logic circuitry may only encrypt the payload of the non-time-critical data packet, leaving the header or at least part of the header unencrypted. Also, if the intended recipient vehicle does not have a symmetric key, the platoon logic circuitry may include a symmetric key encrypted with a public key and add a certificate to authenticate the public key.

After signing and optionally encrypting the data packet, the platoon logic circuitry may pass the data packet to a wireless network interface for transmission to the recipient vehicle (3040). If the platoon logic circuitry executes more tasks and, thus, more data packets (element 3050), the flowchart 3000 returns to the element 3005.

FIG. 3B illustrates a flowchart 3100 of a decoding process of a data packet. The flowchart 3100 begins with receiving a data packet (element 3105). The platoon logic circuitry may receive a data packet from a leader vehicle in the platoon or another follower vehicle in the platoon. After receiving the data packet, the platoon logic circuitry may determine a vehicle ID and a packet type from the data packet (element 3110).

The non-time critical data packets may have unencrypted headers and encrypted payloads. In such embodiments, the platoon logic circuitry may determine if the packet type is a platoon task and if a vehicle ID in the header is a vehicle ID from which the platoon logic circuitry expects to receive data packets in accordance with a communication topology implemented by the platoon. If so, the platoon logic circuitry stores the data packet in the non-time-critical data queue (element 3120). Otherwise, the platoon logic circuitry drops the data packet (element 3150), which means that the platoon logic circuitry does not process the data packet but instead purges the packet from the queue or overwrites the data packet with a subsequent data packet.

If the data packet is not encrypted, the platoon logic circuitry determines if the data packet is a platooning task from a vehicle participating in the platoon and if the vehicle ID relates the source of the data packet to a source vehicle from which the platoon logic circuitry expects to receive data packets. If the data packet is not from the platoon, the data packet is passed to other corresponding applications (element 3117). If the data packet is not from a platoon source from which the platoon logic circuitry expects to receive a data packet, the data packet is dropped (element 3150). Otherwise, the platoon logic circuitry determines if the data packet is time-critical (element 3120) and adds the data packet to a time-critical data packet queue (element 3125) if the data packet is time-critical.

The platoon logic circuitry may select a data packet from the critical-time queue or the non-critical-time queue to process (element 3135) and may process the time-critical data packets at a higher rate than non-time-critical data packets to process the time-critical data packets within an E2EL of, e.g., 100 milliseconds or less. If the data packet is time-critical, it may carry one or more MACs, generated with pairwise symmetric keys. If the data packet is non-time-critical, it may carry a digital signature.

If the signature or the MAC is valid (element 3140), the platoon logic circuitry passes the payload of the data packet to a vehicle controller to process the packet (element 3145). Otherwise, the platoon logic circuitry drops the data packet (element 3150). If more data packets are available, the platoon logic circuitry returns to element 3115.

Figure 4:
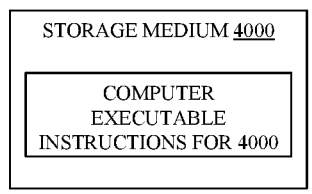
FIGS. 4-5 depict embodiments of a storage medium to store code to support vehicle-to-vehicle communications for platooning and a computing platform to perform vehicle-to-vehicle communications for platooning.

FIG. 4 illustrates an example of a storage medium 4000 to store processor data structures. Storage medium 4000 may comprise an article of manufacture. In some examples, storage medium 4000 may include any non-transitory computer readable medium or machine-readable medium, such as an optical, magnetic or semiconductor storage. Storage medium 4000 may store various types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 5:
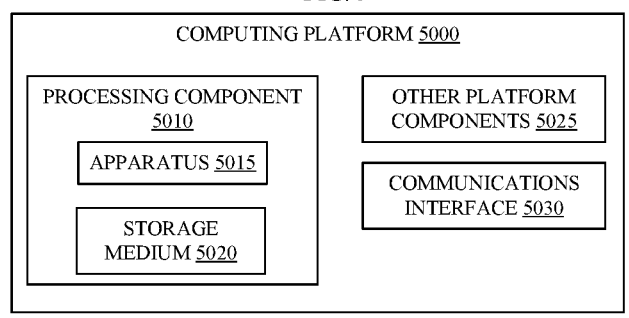

FIG. 5 illustrates an example computing platform 5000. In some examples, as shown in FIG. 5, computing platform 5000 may include a processing component 5010, other platform components or a communications interface 5030. According to some examples, computing platform 5000 may be implemented in a computing device such as a server in a system such as a data center or server farm that supports a manager or controller for managing configurable computing resources as mentioned above. Furthermore, the communications interface 5030 may comprise a wake-up radio (WUR) and may be capable of waking up a main radio of the computing platform 5000.

According to some examples, processing component 5010 may execute processing operations or logic for apparatus 5015 described herein. Processing component 5010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 5020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 5025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 5030 may include logic and/or features to support a communication interface. For these examples, communications interface 5030 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 5000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 5000 described herein, may be included or omitted in various embodiments of computing platform 5000, as suitably desired.

The components and features of computing platform 5000 may be implemented using any combination of discrete circuitry, ASICs, logic gates and/or single chip architectures. Further, the features of computing platform 5000 may be implemented using microcontrollers, programmable logic arrays and/or microprocessors or any combination of the foregoing where suitably appropriate. It is noted that hardware, firmware and/or software elements may be collectively or individually referred to herein as "logic".

It should be appreciated that the exemplary computing platform 5000 shown in the block diagram of FIG. 5 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and also implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

Several embodiments have one or more potentially advantages effects. For instance, implementing a hybrid security approach for time-critical data packets and non-time-critical data packets advantageously reduces the encoding and decoding time for the time-critical data packets and improves the manageability of the end-to-end latency (E2EL) of the time-critical data packets. Encoding/decoding a message authentication code (MAC) for the data packet and a first cryptographic key advantageously reduces the encoding/decoding time for the data packet. Receiving a data packet with a second MAC from a second vehicle signed with a second cryptographic key advantageously reduces the E2EL of a time-critical data packet. Generating a third MAC with a third cryptographic key and appending the third MAC to the data packet with the MAC prior to transmission of the data packet advantageously reduces the encoding time for a data packet destined for more than one vehicles participating in a platoon. Generating a hash with a MAC algorithm advantageously reduces encoding time for time-critical data packets. Generating a MAC using a hash function such as Keccak advantageously reduces encoding time for time-critical data packets by reducing the number of hashes required to generate a MAC. Verifying a third MAC with a third cryptographic key appended the third MAC to the data packet with the MAC advantageously reduces the decoding time for a data packet received by more than one vehicles participating in a platoon. Verifying a hash with a MAC algorithm advantageously reduces decoding time for time-critical data packets over use of a digital signature. Verifying a Keccak MAC advantageously reduces decoding time for time-critical data packets by reducing the number of hashes required to generate a MAC.

EXAMPLES OF FURTHER EMBODIMENTS

The following examples pertain to further embodiments. Specifics in the examples may be used anywhere in one or more embodiments.

Example 1 is an apparatus to perform vehicle-to-vehicle communications for a platoon. The apparatus comprises a platoon logic circuitry to receive information about longitudinal and lateral motion of a first vehicle to transmit to a second vehicle, the first vehicle and the second vehicle to participate in the platoon; generate a data packet comprising the information; generate a message authentication code (MAC) for the data packet and a first cryptographic key, wherein the first cryptographic key comprises a symmetric encryption key configured to encrypt communications to and decrypt communications from the second vehicle; and a physical layer device to transmit the data packet with the MAC to the second vehicle. In Example 2, the apparatus of Example 1, further comprising a processor, a memory coupled with the processor, a radio coupled with the physical layer device, and one or more antennas coupled with the radio to transmit an orthogonal frequency-division multiple access (OFDMA) modulated signal. In Example 3, the apparatus of Example 1, wherein the platoon logic circuitry is configured to receive a data packet with a second MAC from the second vehicle signed with the second cryptographic key, wherein the second cryptographic key is a symmetric encryption key configured to encrypt communications that can be decrypted with the first cryptographic key.

In Example 4, the apparatus of Example 1, wherein the platoon logic circuitry is configured to generate a third MAC with a third cryptographic key and append the third MAC to the data packet with the MAC prior to transmission of the data packet, wherein the first vehicle is the leader of the platoon and transmission of the data packet comprises transmission of the data packet to the second vehicle and the third vehicle. In Example 5, the apparatus of Example 1, wherein the platoon logic circuitry is configured to generate a third MAC with a third cryptographic key, append the third MAC to the data packet, and transmit the data packet with the third MAC to the third vehicle, wherein the first vehicle is a follower vehicle. In Example 6, the apparatus of Example 1, wherein the MAC comprises a Keccak message authentication code (KMAC). In Example 7, the apparatus of Example 6, wherein the hash comprises a Keccak HMAC. In Example 8, the apparatus of Example 6, wherein the MAC comprises an SHA3-256 MAC. In Example 9, the apparatus of Example 1, wherein the MAC comprises a hash of a concatenation of the first cryptographic key and the data packet. In Example 10, the apparatus of Example 1, wherein the information is received periodically, comprises longitudinal and lateral motion information, and is associated with an end-to-end latency requirement. In Example 11, the apparatus of Example 1, wherein the information comprises sensor data about an acceleration of the first vehicle, a heading of the first vehicle, a driving space of the first vehicle, or a combination thereof. In Example 12, the apparatus of Example 11, wherein the information comprises a heading, an acceleration, an elevation, a steering wheel angle, a brake system status, a traction control status, a transmission state, a stability control status, a heading, a heading speed, or a combination thereof for the first vehicle. In Example 13, the apparatus of Example 11, wherein the platoon logic circuitry is configured to decode a second data packet from the second vehicle, the platoon logic circuitry to decode a header of the second data packet to determine if a packet type in the header indicates a platoon task and to determine if a vehicle ID in the header indicates a vehicle participating in the platoon that communicates with the first vehicle in accordance with a communication topology associated with the platoon.

Example 14 is a method to perform vehicle-to-vehicle communications for a platoon. The method comprises receiving, by a platoon logic circuitry, information about longitudinal and lateral motion of a first vehicle participating in the platoon to transmit to a second vehicle participating in the platoon; generating, by the platoon logic circuitry, a data packet comprising the information; generating, by the platoon logic circuitry, a message authentication code (MAC) for the data packet and a first cryptographic key, wherein the first cryptographic key comprises a symmetric encryption key configured to encrypt communications to and decrypt communications from the second vehicle; and transmitting, by a physical layer device, the data packet with the MAC to the second vehicle. In Example 15, the method of Example 14, further comprising receiving a second data packet with a second MAC from the second vehicle signed with the second cryptographic key, wherein the second cryptographic key is a symmetric encryption key configured to encrypt communications that can be decrypted with the first cryptographic key. In Example 16, the method of Example 14, further comprising generating a third MAC with a third cryptographic key and appending the third MAC to the data packet prior to transmitting the data packet with the MAC, wherein the first vehicle is the leader of the platoon and transmitting the data packet comprises transmitting the data packet to the second vehicle and the third vehicle. In Example 17, the method of Example 14, further comprising generating a third MAC with a third cryptographic key, appending the third MAC to the data packet, and transmitting the data packet with the third MAC to the third vehicle, wherein the first vehicle is a follower vehicle.

In Example 18, the method of Example 14, wherein the MAC comprises a Keccak message authentication code (KMAC). In Example 19, the method of Example 18, wherein the hash comprises a Keccak HMAC. In Example 20, the method of Example 18, wherein the MAC comprises an SHA3-256 MAC. In Example 21, the method of Example 14, wherein the MAC comprises a hash of a concatenation of the first cryptographic key and the data packet. In Example 22, the method of Example 14, wherein the information is received periodically, comprises longitudinal and lateral motion information, and is associated with an end-to-end latency requirement. In Example 23, the method of Example 14, wherein the information comprises sensor data about an acceleration of the first vehicle, a heading of the first vehicle, a driving space of the first vehicle, or a combination thereof. In Example 24, the method of Example 23, wherein the information comprises a heading, an acceleration, an elevation, a steering wheel angle, a brake system status, a traction control status, a transmission state, a stability control status, a heading, a heading speed, or a combination thereof for the first vehicle. In Example 25, the method of Example 24, wherein further comprising decoding, by the platoon logic circuitry of the first vehicle, a second data packet from the second vehicle, the platoon logic circuitry to decode a header of the second data packet to determine if a packet type in the header indicates a platoon task and to determine if a vehicle ID in the header indicates a vehicle participating in the platoon that communicates with the first vehicle in accordance with a communication topology associated with the platoon.

In Example 26, a computer readable medium having stored thereon instructions that when executed cause a computer to perform operations comprising the operations of any one of Examples 14-25. In Example 27, an apparatus to perform vehicle-to-vehicle communications for a platoon, the apparatus comprising a means for performing any one of Examples 14-25. In Example 28, a program for causing a computer to perform operations comprising operations of any one of Examples 14-25. In Example 29, a computer-readable storage medium for storing the program of Example 28.

Example 30 is a computer program product comprising a non-transitory computer-readable medium, comprising instructions, which when executed by a processor cause the processor to perform operations. The operations comprise receiving information about longitudinal and lateral motion of a first vehicle participating in the platoon to transmit to a second vehicle participating in the platoon; generating a data packet comprising the information; generating, by the platoon logic circuitry, a message authentication code (MAC) for the data packet and a first cryptographic key, wherein the first cryptographic key comprises a symmetric encryption key configured to encrypt communications to and decrypt communications from the second vehicle; and outputting, by the platoon logic circuitry, the data packet with the MAC to a physical layer device to transmit to the second vehicle. In Example 31, the computer program product of Example 30, wherein the operations further comprise receiving a second data packet with a second MAC from the second vehicle signed with the second cryptographic key, wherein the second cryptographic key is a symmetric encryption key configured to encrypt communications that can be decrypted with the first cryptographic key. In Example 32, the computer program product of Example 30, wherein the operations further comprise generating a third MAC with a third cryptographic key and appending the third MAC to the data packet prior to transmitting the data packet with the MAC, wherein the first vehicle is the leader of the platoon and transmitting the data packet comprises transmitting the data packet to the second vehicle and the third vehicle. In Example 33, the computer program product of Example 30, wherein the operations further comprise generating a third MAC with a third cryptographic key, appending the third MAC to the data packet, and transmitting the data packet with the third MAC to the third vehicle, wherein the first vehicle is a follower vehicle.

In Example 34, the computer program product of Example 30, wherein the MAC comprises a Keccak message authentication code (KMAC). In Example 35, the computer program product of Example 30, wherein the hash comprises a Keccak HMAC. In Example 36, the computer program product of Example 30, wherein the MAC comprises an SHA3-256 MAC. In Example 37, the computer program product of Example 30, wherein the MAC comprises a hash of a concatenation of the first cryptographic key and the data packet. In Example 38, the computer program product of Example 30, wherein the information is received periodically, comprises longitudinal and lateral motion information, and is associated with an end-to-end latency requirement. In Example 39, the computer program product of Example 30, wherein the information comprises sensor data about an acceleration of the first vehicle, a heading of the first vehicle, a driving space of the first vehicle, or a combination thereof. In Example 40, the computer program product of Example 39, wherein the information comprises a heading, an acceleration, an elevation, a steering wheel angle, a brake system status, a traction control status, a transmission state, a stability control status, a heading, a heading speed, or a combination thereof for the first vehicle. In Example 41, the computer program product of Example 40, wherein the operations further comprise decoding, by the platoon logic circuitry of the first vehicle, a second data packet from the second vehicle, the platoon logic circuitry to decode a header of the second data packet to determine if a packet type in the header indicates a platoon task and to determine if a vehicle ID in the header indicates a vehicle participating in the platoon that communicates with the first vehicle in accordance with a communication topology associated with the platoon.

Example 42 is a system to perform vehicle-to-vehicle communications for a platoon. The system comprises a platoon logic circuitry to receive information about longitudinal and lateral motion of a first vehicle to transmit to a second vehicle, the first vehicle and the second vehicle to participate in the platoon; generate a data packet comprising the information; generate a message authentication code (MAC) for the data packet and a first cryptographic key, wherein the first cryptographic key comprises a symmetric encryption key configured to encrypt communications to and decrypt communications from the second vehicle; a physical layer device to transmit the data packet with the MAC to the second vehicle; a radio coupled with the physical layer device; and one or more antennas coupled with the radio. In Example 43, the system of Example 42, further comprising a processor, a memory coupled with the processor. In Example 44, the system of Example 42, wherein the platoon logic circuitry is configured to receive a second data packet with a second MAC from the second vehicle signed with the second cryptographic key, wherein the second cryptographic key is a symmetric encryption key configured to encrypt communications that can be decrypted with the first cryptographic key. In Example 45, the system of Example 42, wherein the platoon logic circuitry is configured to generate a third MAC with a third cryptographic key and append the third MAC to the data packet with the MAC prior to transmission of the data packet, wherein the first vehicle is the leader of the platoon and transmission of the data packet comprises transmission of the data packet to the second vehicle and the third vehicle. In Example 46, the system of Example 42, wherein the platoon logic circuitry is configured to generate a third MAC with a third cryptographic key, append the third MAC to the data packet, and transmit the data packet with the third MAC to the third vehicle, wherein the first vehicle is a follower vehicle.

In Example 47, the system of Example 42, wherein the data packet comprises padding. In Example 48, the system of Example 42, wherein the MAC comprises a Keccak message authentication code (KMAC). In Example 49, the system of Example 48, wherein the hash comprises a Keccak HMAC. In Example 50, the system of Example 49, wherein the MAC comprises an SHA3-256 MAC. In Example 51, the system of Example 42, wherein the MAC comprises a hash of a concatenation of the first cryptographic key and the data packet. In Example 52, the system of Example 42, wherein the information is received periodically, comprises longitudinal and lateral motion information, and is associated with an end-to-end latency requirement. In Example 53, the system of Example 42, wherein the information comprises sensor data about an acceleration of the first vehicle, a heading of the first vehicle, a driving space of the first vehicle, or a combination thereof. In Example 54, the system of Example 53, wherein the information comprises a heading, an acceleration, an elevation, a steering wheel angle, a brake system status, a traction control status, a transmission state, a stability control status, a heading, a heading speed, or a combination thereof for the first vehicle. In Example 55, the system of Example 53, wherein the platoon logic circuitry is configured to decode a second data packet from the second vehicle, the platoon logic circuitry to decode a header of the second data packet to determine if a packet type in the header indicates a platoon task and to determine if a vehicle ID in the header indicates a vehicle participating in the platoon that communicates with the first vehicle in accordance with a communication topology associated with the platoon.

Example 56 is an apparatus to perform vehicle-to-vehicle communications for a platoon. The apparatus comprises a means for receiving information about longitudinal and lateral motion of a first vehicle participating in the platoon to transmit to a second vehicle participating in the platoon; a means for generating a data packet comprising the information; a means for generating a message authentication code (MAC) for the data packet and a first cryptographic key, wherein the first cryptographic key comprises a symmetric encryption key configured to encrypt communications to and decrypt communications from the second vehicle; and a means for transmitting the data packet with the MAC to the second vehicle. In Example 57, the apparatus of Example 56, further comprising a means for a second data packet with a second MAC from the second vehicle signed with the second cryptographic key, wherein the second cryptographic key is a symmetric encryption key configured to encrypt communications that can be decrypted with the first cryptographic key. In Example 58, the apparatus of Example 56, further comprising a means for generating a third MAC with a third cryptographic key and appending the third MAC to the data packet prior to transmitting the data packet with the MAC, wherein the first vehicle is the leader of the platoon and transmitting the data packet comprises transmitting the data packet to the second vehicle and the third vehicle. In Example 59, the apparatus of Example 56, further comprising a means for generating a third MAC with a third cryptographic key, appending the third MAC to the data packet, and transmitting the data packet with the third MAC to the third vehicle, wherein the first vehicle is a follower vehicle. In Example 60, the apparatus of Example 56, wherein the MAC comprises a Keccak message authentication code (KMAC).

In Example 61, the apparatus of Example 60, wherein the hash comprises a Keccak HMAC. In Example 62, the apparatus of Example 60, wherein the MAC comprises an SHA3-256 MAC. In Example 63, the apparatus of Example 56, wherein the MAC comprises a hash of a concatenation of the first cryptographic key and the data packet. In Example 64, the apparatus of Example 56, wherein the information is received periodically, comprises longitudinal and lateral motion information, and is associated with an end-to-end latency requirement. In Example 65, the apparatus of Example 56, wherein the information comprises sensor data about an acceleration of the first vehicle, a heading of the first vehicle, a driving space of the first vehicle, or a combination thereof. In Example 66, the apparatus of Example 65, wherein the information comprises a heading, an acceleration, an elevation, a steering wheel angle, a brake system status, a traction control status, a transmission state, a stability control status, a heading, a heading speed, or a combination thereof for the first vehicle. In Example 67, the apparatus of Example 65, further comprising a means for decoding, by the first vehicle, a second data packet from the second vehicle, the first vehicle to decode a header of the second data packet to determine if a packet type in the header indicates a platoon task and to determine if a vehicle ID in the header indicates a vehicle participating in the platoon that communicates with the first vehicle in accordance with a communication topology associated with the platoon.

What is claimed is:

1. An apparatus to perform vehicle-to-vehicle communications for a platoon, the apparatus comprising:
    a physical layer device; and
    circuitry coupled to the physical layer device, the circuitry to:
        receive information about longitudinal and lateral motion of a first vehicle to transmit to a second vehicle, the first vehicle, the second vehicle, and a third vehicle to participate in the platoon;
        generate a data packet comprising the information;
        generate a first message authentication code (MAC) for the data packet with a first cryptographic key, wherein the first cryptographic key is a symmetric encryption key configured to encrypt communications to and decrypt communications from the second vehicle;
        generate a second MAC for the data packet with a second cryptographic key, wherein the second cryptographic key is a symmetric encryption key configured to encrypt communications to and decrypt communications from the third vehicle, the second cryptographic key different from the first cryptographic key;
        append the first MAC and the second MAC to the data packet; and
        transmit, via the physical layer device, the data packet with the first MAC and the second MAC to the second vehicle,
        wherein the second vehicle to use the first MAC to authenticate the data packet and the third vehicle to use the second MAC to authenticate the data packet.

2. The apparatus of claim 1, further comprising a processor, a memory coupled with the processor, a radio coupled with the physical layer device, and one or more antennas coupled with the radio to transmit an orthogonal frequency-division multiple access (OFDMA) modulated signal.

3. The apparatus of claim 1, wherein the circuitry is configured to receive a second data packet with a third MAC from the second vehicle signed with a third cryptographic key, wherein the third cryptographic key is a symmetric encryption key configured to encrypt communications that can be decrypted with the first cryptographic key.

4. The apparatus of claim 1, wherein the first MAC comprises a Keccak message authentication code (KMAC).

5. The apparatus of claim 4, wherein the first MAC comprises an SHA3-256 MAC.

6. The apparatus of claim 1, wherein the first MAC comprises a hash of a concatenation of the first cryptographic key and the data packet.

7. The apparatus of claim 1, wherein the information is received periodically, comprises longitudinal and lateral motion information, and is associated with an end-to-end latency requirement.

8. A method to perform vehicle-to-vehicle communications for a platoon, the method comprising:
    receiving, by circuitry, information about longitudinal and lateral motion of a first vehicle participating in the platoon to transmit to a second vehicle participating in the platoon, the platoon comprising the first vehicle, the second vehicle, and a third vehicle;
    generating, by the circuitry, a data packet comprising the information;
    generating, by the circuitry, a first message authentication code (MAC) for the data packet with a first cryptographic key, wherein the first cryptographic key is a symmetric encryption key configured to encrypt communications to and decrypt communications from the second vehicle;
    generating a second MAC for the data packet with a second cryptographic key, wherein the second cryptographic key is a symmetric encryption key configured to encrypt communications to and decrypt communications from the third vehicle, the second cryptographic key different from the first cryptographic key;
    appending the first MAC and the second MAC to the data packet; and
    transmitting, by a physical layer device, the data packet with the first MAC and the second MAC to the second vehicle,
    wherein the second vehicle to use the first MAC to authenticate the data packet and the third vehicle to use the second MAC to authenticate the data packet.

9. The method of claim 8, further comprising receiving a second data packet with a third MAC from the second vehicle signed with a third cryptographic key, wherein the third cryptographic key is a symmetric encryption key configured to encrypt communications that can be decrypted with the first cryptographic key.

10. The method of claim 8, further comprising decoding, by the circuitry, a second data packet from the second vehicle, the circuitry to decode a header of the second data packet to determine if a packet type in the header indicates a platoon task and to determine if a vehicle ID in the header indicates a vehicle participating in the platoon that communicates with the first vehicle in accordance with a communication topology associated with the platoon.

11. The method of claim 8, wherein the first MAC comprises a Keccak message authentication code (KMAC).

12. The method of claim 8, wherein the first MAC comprises a hash of a concatenation of the first cryptographic key and the data packet.

13. The method of claim 8, wherein the information is received periodically, comprises longitudinal and lateral motion information, and is associated with an end-to-end latency requirement.

14. A computer program product comprising a non-transitory computer-readable medium, comprising instructions, which when executed by a processor of a vehicle in a platoon, cause the processor to:
receive information about longitudinal and lateral motion of a first vehicle participating in the platoon to transmit to a second vehicle participating in the platoon, the first vehicle, the second vehicle, and a third vehicle to participate in the platoon;
generate a data packet comprising the information;
generate a first message authentication code (MAC) for the data packet and a first cryptographic key, wherein the first cryptographic key is a symmetric encryption key configured to encrypt communications to and decrypt communications from the second vehicle;
generate a second MAC for the data packet with a second cryptographic key, wherein the second cryptographic key is a symmetric encryption key configured to encrypt communications to and decrypt communications from the third vehicle, the second cryptographic key different from the first cryptographic key;
append the first MAC and the second MAC to the data packet; and
output the data packet with the first MAC and the second MAC to a physical layer device to transmit to the second vehicle,
wherein the second vehicle to use the first MAC to authenticate the data packet and the third vehicle to use the second MAC to authenticate the data packet.

15. The computer program product of claim 14, comprising instructions that when executed by the processor further cause the processor to receive a second data packet with a third MAC from the second vehicle signed with a third cryptographic key, wherein the third cryptographic key is a symmetric encryption key configured to encrypt communications that can be decrypted with the first cryptographic key.

16. The computer program product of claim 14, wherein the first MAC comprises a hash of a concatenation of the first cryptographic key and the data packet.

17. The computer program product of claim 14, wherein the information comprises sensor data about an acceleration of the first vehicle, a heading of the first vehicle, a driving space of the first vehicle, or a combination thereof.

18. A system to perform vehicle-to-vehicle communications for a platoon, the system comprising:
a physical layer device;
circuitry coupled to the physical layer device, the circuitry to:
receive information about longitudinal and lateral motion of a first vehicle to transmit to a second vehicle, the first vehicle, the second vehicle, and a third vehicle to participate in the platoon;
generate a data packet comprising the information;
generate a first message authentication code (MAC) for the data packet and a first cryptographic key, wherein the first cryptographic key is a symmetric encryption key configured to encrypt communications to and decrypt communications from the second vehicle;
generate a second MAC for the data packet with a second cryptographic key, wherein the second cryptographic key is a symmetric encryption key configured to encrypt communications to and decrypt communications from the third vehicle, the second cryptographic key different from the first cryptographic key;
append the first MAC and the second MAC to the data packet; and
transmit, via the physical layer device, the data packet with the first MAC and the second MAC to the second vehicle;
a radio coupled with the physical layer device; and
one or more antennas coupled with the radio,
wherein the second vehicle to use the first MAC to authenticate the data packet and the third vehicle to use the second MAC to authenticate the data packet.

19. The system of claim 18, further comprising a processor, a memory coupled with the processor.

20. The system of claim 18, wherein the MAC comprises an SHA3-256 MAC.

21. The system of claim 18, wherein the information comprises a heading, an acceleration, an elevation, a steering wheel angle, a brake system status, a traction control status, a transmission state, a stability control status, a heading speed, or a combination thereof for the first vehicle.

* * * * *